(12) United States Patent
Zhou et al.

(10) Patent No.: US 11,497,009 B2
(45) Date of Patent: Nov. 8, 2022

(54) FREQUENCY DOMAIN RESOURCE ALLOCATION METHOD AND APPARATUS

(71) Applicant: HUAWEI TECHNOLOGIES CO., LTD., Shenzhen (CN)

(72) Inventors: Han Zhou, Shanghai (CN); Meng Hua, Shanghai (CN); Shurong Jiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 16/993,045

(22) Filed: Aug. 13, 2020

(65) Prior Publication Data

US 2020/0374851 A1 Nov. 26, 2020

Related U.S. Application Data

(63) Continuation of application No. PCT/CN2018/076883, filed on Feb. 14, 2018.

(51) Int. Cl.
*H04W 72/04* (2009.01)

(52) U.S. Cl.
CPC ..... *H04W 72/042* (2013.01); *H04W 72/0453* (2013.01)

(58) Field of Classification Search
CPC .......................... H04W 72/042; H04W 72/0453
See application file for complete search history.

(56) References Cited

U.S. PATENT DOCUMENTS

2019/0215809 A1* 7/2019 Yang ...................... H04L 25/02

FOREIGN PATENT DOCUMENTS

| CN | 103179687 A | * | 6/2013 | ............ H04W 28/16 |
|---|---|---|---|---|
| CN | 105517154 A | | 4/2016 | |
| EP | 3174352 A1 | | 5/2017 | |
| WO | WO-2012150664 A1 | * | 11/2012 | ........... H04L 5/0041 |
| WO | 2017035762 A1 | | 3/2017 | |
| WO | 2017166085 A1 | | 10/2017 | |
| WO | WO-2018143756 A1 | * | 8/2018 | ............... H04L 1/00 |

OTHER PUBLICATIONS

English translation of CN-103179687-A, 2013, retrieved from PE2E Search on Apr. 5, 2022. (Year: 2013).*

(Continued)

*Primary Examiner* — Omar J Ghowrwal
(74) *Attorney, Agent, or Firm* — Hauptman Ham, LLP

(57) ABSTRACT

A frequency domain resource allocation method includes receiving frequency domain resource configuration information sent by a base station, where the frequency domain resource configuration information is used to indicate frequency domain resources configured for the user equipment UE, and the frequency domain resources include at least one available frequency domain resource segment and at least one unavailable frequency domain resource segment; and receiving frequency domain resource indication information sent by the base station, where the frequency domain resource indication information is used to indicate a frequency domain resource that is in the at least one available frequency domain resource segment and that is used by the UE to transmit data.

20 Claims, 15 Drawing Sheets

(56) References Cited

OTHER PUBLICATIONS

English translation of WO-2018143756-A1, 2018, retrieved from PE2E Search on Apr. 5, 2022. (Year: 2018).*
ETSI TS 136 213 V10.10.0 (Jul. 2013) LTE; Evolved Universal Terrestrial Radio Access (E-UTRA); Physical layer procedures [retrieved on Jun. 14, 2022], Retrieved from Internet: <URL: <https://www.etsi.org/deliver/etsi_ts/136200_136299/136213/10.10.00_60/ts_136213v101000p.pdf>. (Year: 2013).*
English translation of WO-2012150664-A1, Retrieved from PE2E Search on Jun. 14, 2022. (Year: 2012).*
CATT., "On PDSCH and PUSCH resource allocation", R1-1800257, 3GPP TSG RAN WG1 Meeting AH 1801, Vancouver, Canada, Jan. 22-26, 2018, total 23 pages.
Huawei, Hisilicon,, "Summary of remaining issues on UL data transmission procedure", R1-1800060, 3GPP TSG RAN NG1 NR Ad Hoc Meeting, Vancouver, Canada, Jan. 22-26, 2018, total 6 pages.
3GPP TS 38.214 V15.0.0 (Dec. 2017), "3rd Generation Partnership Project; Technical Specification Group Radio Access Network; NR; Physical layer precedures for data (Release 15)", total 71 pages.
International Search Report issued in corresponding International Application No. PCT/CN2018/076883, dated Nov. 6, 2018, State Intellectual Property Office of the P.R. China, Beijing, China.

Nokia:"DraftCR to 38.214 capturing the Jan. 18 ad-hoc meeting agreements", 3GPP TSG RAN WG1 Meeting AH 1801; R1-1801286, Vancouver, Canada, Jan. 22-26, 2018, total 2 pages. XP051398846.
Huawei, HiSilicon: "Remaining issues on resource allocation and TBS", 3GPP TSG RAN WG1 Ad Hoc Meeting; R1-1800019, Vancouver, Canada, Jan. 22-26, 2018, total 15 pages. XP051384522.
Samsung: "DL/UL Frequency Resource Allocation", 3GPP TSG RAN WG1 Meeting #90; R1-1713635, Prague, Czechia, Aug. 21-25, 2017, total 9 pages. XP051316435.
Interdigital et al: "On remaining details of data resource allocation", 3GPP TSG RAN WG1 Meeting 90bis, R1-1718494, Prague, CZ, Oct. 9-13, 2017, total 5 pages. XP051341676.
3GPP TS 38.214 V15.0.1 (Feb. 2018), 3rd Generation Partnership Project; Technical Specification Group Radio Access Network; NR; Physical layer procedures for data (Release 15), Feb. 2018. total 72 pages.
Extended European Search Report issued in corresponding European Patent Application No. 18906150.0, dated Nov. 16, 2020, pp. 1-9, Munich, Germany.
India Office Action issued in corresponding India Application No. 202027032027, dated Nov. 15, 2021, pp. 1-6, Intellectual Property India, Mumbai, India.

* cited by examiner

FREQUENCY DOMAIN RESOURCE ALLOCATION METHOD AND APPARATUS

CROSS-REFERENCE TO RELATED APPLICATIONS

This application is a continuation of International Application No. PCT/CN2018/076883, filed on Feb. 14, 2018, the disclosure of which is hereby incorporated by reference in its entirety.

TECHNICAL FIELD

This application relates to the field of communication technologies, and in particular, to a frequency domain resource allocation method and apparatus.

BACKGROUND

In a 5th generation (5G) mobile communications system, sometimes referred to as a new radio (NR) system, a base station may configure bandwidth parts (BWP) with different bandwidth sizes for user equipment (UE), and may allocate some frequency domain resources in the BWPs to the UE, so that the UE receives downlink data or sends uplink data.

In a frequency domain resource allocation process, the base station may allocate frequency domain resources in a unit of a resource block group ( ) (referred to as a frequency domain resource allocation manner 0 below). Herein, one RBG includes a plurality of consecutive resource blocks (resource block, RB). Alternatively, the base station allocates frequency domain resources in a form of a virtual resource block (VRB). Herein, a specific mapping relationship exists between an RB in the VRB and a physical resource block (PRB). For example, when allocating frequency domain resources to the UE in the frequency domain resource allocation manner 0, the base station determines a quantity N of RBGs included in entire frequency domain resources (including an available frequency domain resource and an unavailable frequency domain resource) included in one or more BWPs, and then uses downlink control information (DCI) to send frequency domain resource indication information including N bits to the UE. When allocating frequency domain resources to the UE in the frequency domain resource allocation manner 1, the base station may determine a resource indication value (RIV) according to the start location (that is, the start VRB) in entire frequency domain resources included in one or more BWPs and a length of the BWP (that is, a total quantity of included VRBs). Then, the base station sends frequency domain resource indication information including the RIV to the UE by using DCI. The RIV may indicate a VRB allocated to the UE. A PRB corresponding to the VRB may be determined according to a mapping relationship between the VRB and the PRB.

However, in the foregoing two frequency domain resource allocation methods, a quantity of bits of the DIC required for sending the resource indication information to the UE by using the DCI is directly proportional to a total bandwidth of all BWPs. The base station determines the quantity of RBGs or the RIV according to the entire frequency domain resources included in all the BWPs. However, the BWP may include an unavailable frequency domain resource (which may also be referred to as a reserved resource). Therefore, when the base station sends the resource indication information to the UE, some bits are required to indicate the reserved resource. As a result, there are a relatively large quantity of bits in the DCI for sending the resource indication information, causing relatively high overheads required for frequency domain resource allocation.

SUMMARY

This application provides a frequency domain resource allocation method and apparatus, to reduce signaling overheads required for allocating frequency domain resources to UE.

To achieve the foregoing objectives, the following technical solutions are used in this application:

According to a first aspect, a frequency domain resource allocation method is provided. The method includes: receiving frequency domain resource configuration information sent by a base station, where the frequency domain resource configuration information is used to indicate frequency domain resources configured for UE, and the frequency domain resources include at least one available frequency domain resource segment and at least one unavailable frequency domain resource segment; and receiving frequency domain resource indication information sent by the base station, where the frequency domain resource indication information is used to indicate a frequency domain resource that is in the at least one available frequency domain resource segment and that is used by the UE to transmit data.

In a first optional implementation of the first aspect, the frequency domain resource allocation method provided in this application may further include: receiving an update message sent by the base station, where the update message is used to indicate that a part of the at least one available frequency domain resource segment is changed to an unavailable frequency domain resource segment, or the update message is used to indicate that a part of the at least one unavailable frequency domain resource segment is changed to an available frequency domain resource segment.

In this application, the UE may learn a frequency domain resource change status according to the update message sent by the base station. When the part of the at least one available frequency domain resource segment is changed to the unavailable frequency domain resource segment, the UE may avoid the unavailable frequency domain resource segment during data transmission. When the part of the at least one unavailable frequency domain resource segment is changed to the available frequency domain resource segment, the UE may transmit data on a frequency domain resource in the available frequency domain resource segment.

According to a second aspect, a frequency domain resource allocation method is provided. The method includes: sending frequency domain resource configuration information to UE, where the frequency domain resource configuration information is used to indicate frequency domain resources configured for the UE, and the frequency domain resources include at least one available frequency domain resource segment and at least one unavailable frequency domain resource segment; and sending frequency domain resource indication information to the UE, where the frequency domain resource indication information is used to indicate a frequency domain resource that is in the at least one available frequency domain resource segment and that is used by the UE to transmit data.

In the frequency domain resource allocation method provided in this application, the frequency domain resource indication information sent by the base station to the UE is used to indicate the frequency domain resource that is in the at least one available frequency domain resource segment and that is used by the UE to transmit data, and the frequency domain resource indication information no longer indicates a frequency domain resource in the at least one unavailable frequency domain resource segment. Therefore, a quantity of bits of DCI used by the base station to send the frequency domain resource indication information to the UE can be reduced, thereby reducing signaling overheads required for allocating the frequency domain resources to the UE.

In a first optional implementation of the second aspect, the frequency domain resource allocation method provided in this application may further include: sending an update message to the UE, where the update message is used to indicate that a part of the at least one available frequency domain resource segment is changed to an unavailable frequency domain resource segment, or the update message is used to indicate that a part of the at least one unavailable frequency domain resource segment is changed to an available frequency domain resource segment.

In this application, the base station sends the update message to the UE, to indicate change statuses of an available frequency domain resource and an unavailable frequency domain resource in the frequency domain resources configured for the UE. When the available frequency domain resource increases, the DCI required for sending the frequency domain resource indication information increases. When the available frequency domain resource decreases, the DCI required for sending the frequency domain resource indication information decreases.

According to a third aspect, UE is provided. The UE includes a receiving module. The receiving module is configured to: receive frequency domain resource configuration information sent by a base station, where the frequency domain resource configuration information is used to indicate frequency domain resources configured for UE, and the frequency domain resources include at least one available frequency domain resource segment and at least one unavailable frequency domain resource segment; and receive frequency domain resource indication information sent by the base station, where the frequency domain resource indication information is used to indicate a frequency domain resource that is in the at least one available frequency domain resource segment and that is used by the UE to transmit data.

In a first optional implementation of the third aspect, the receiving module may be further configured to: receive an update message sent by the base station, where the update message is used to indicate that a part of the at least one available frequency domain resource segment is changed to an unavailable frequency domain resource segment, or the update message is used to indicate that a part of the at least one unavailable frequency domain resource segment is changed to an available frequency domain resource segment.

According to a fourth aspect, a base station is provided. The base station includes a sending module. The sending module is configured to: send frequency domain resource configuration information UE, where the frequency domain resource configuration information is used to indicate frequency domain resources configured for the UE, and the frequency domain resource includes at least one available frequency domain resource segment and at least one unavailable frequency domain resource segment; and send frequency domain resource indication information to the UE, where the frequency domain resource indication information is used to indicate a frequency domain resource that is in the at least one available frequency domain resource segment and that is used by the UE to transmit data.

In a first optional implementation of the fourth aspect, the sending module may be further configured to: send an update message to the UE, where the update message is used to indicate that all or a part of the at least one available frequency domain resource segment is changed to an unavailable frequency domain resource segment, or the update message is used to indicate that all or a part of the at least one unavailable frequency domain resource segment is changed to an available frequency domain resource segment.

In the first aspect to the fourth aspect, the at least one available frequency domain resource segment includes at least one of the following: at least two BWPs, or at least one available spectrum (AS) in at least one BWP; and the at least one unavailable frequency domain resource segment includes at least one of the following: at least one frequency domain resource segment other than at least two BWPs, or at least one frequency domain resource segment other than at least one AS in at least one BWP.

In the first aspect to the fourth aspect, the frequency domain resource indication information includes RBG indication information. The RBG indication information is used to indicate that at least one of $N_{RBG}$ RBGs is the frequency domain resource used by the UE to transmit data, where $N_{RGB}$ is a total quantity of RBGs included in the at least one available frequency domain resource segment.

In this application, $N_{RBG}$ is the total quantity of RBGs included in the at least one available frequency domain resource segment, and $N_{RGB}$ RBGs do not include an RBG of an unavailable frequency domain resource segment. Therefore, the RBG indication information occupies a relatively small quantity of bits. In other words, relatively low signaling overheads are required when the base station sends the frequency domain resource indication information including the RBG indication information to the UE.

In the first aspect to the fourth aspect, a quantity of RBGs included in any available frequency domain resource segment i in the at least one available frequency domain resource segment meets: $N_{RBG, R_i} = \lceil M_{RB, R_i}/P \rceil$, where $M_{RB, R_i}$ is a quantity of RBs included in the available frequency domain resource segment i, P is a quantity of RBs included in one RBG, $\lceil \ \rceil$ represents rounding up, and i is a natural number.

In the first aspect to the fourth aspect, a quantity of RBGs included in any available frequency domain resource segment i in the at least one available frequency domain resource segment meets: $N_{RBG, R_i} = \lceil (M_{RB, R_i} - M_{RB, R_i, start})/P \rceil + 1$, where $M_{RB, R_i}$ is a quantity of RBs included in the available frequency domain resource segment i, $M_{RB, R_i, start}$ is a quantity of RBs included in the start RBG in the available frequency domain resource segment i, $M_{RB, R_i, start} = P - Q_{R_i, RB}$ mod P, $Q_{R_i, RB}$ is an RB index corresponding to the start RB in the available frequency domain resource segment i, P is a quantity of RBs included in one RBG, $\lceil \ \rceil$ represents rounding up, mod represents a modulo operation, and i is a natural number.

This application provides the foregoing two methods for determining the quantity of RBGs included in the available frequency domain resource segment i. A method may be flexibly selected according to an actual situation, to determine the quantity of RBGs included in the available frequency domain resource segment i.

In the first aspect to the fourth aspect, the frequency domain resource indication information includes a resource indication value RIV. The RIV is used to indicate that N first RBs in a VRB are the frequency domain resource used by the UE to transmit data. A one-to-one mapping relationship exists between the N first RBs in the VRB and N second RBs in the PRB. The N second RBs are RBs in the at least one available frequency domain resource segment.

In this application, the RIV may indicate the N first RBs in the VRB, and the N first RBs are in one-to-one correspondence with the N second RBs. Therefore, the RIV may indirectly indicate a plurality of second RBs in the at least one available frequency domain resource segment, but does not indicate an RB in the unavailable frequency domain resource segment. In this way, a value of the RIV is relatively small. In other words, relatively low signaling overheads are required when the base station sends the frequency domain resource indication information including the RIV to the UE.

In the first aspect to the fourth aspect, the mapping relationship includes interleave mapping between the N first RBs and the N second RBs.

In this application, the N first RBs are mapped to the N second RBs through interleave mapping, so that the RBs allocated to the UE are dispersed in the PRB, and the UE obtains a frequency domain selective gain.

In the first aspect to the fourth aspect, when the at least one available frequency domain resource segment includes at least two available frequency domain resource segments, the interleave mapping between the N first RBs and the N second RBs may be independent interleave mapping of each of the at least two available frequency domain resource segments, and the independent interleave mapping is interleave mapping between a plurality of first RBs corresponding to each available frequency domain resource segment and a plurality of second RBs in each available frequency domain resource segment.

In the first aspect to the fourth aspect, when the at least one available frequency domain resource segment includes at least two available frequency domain resource segments, the interleave mapping between the N first RBs and the N second RBs may be joint interleave mapping of the at least two available frequency domain resource segments as a whole, and the joint interleave mapping is interleave mapping between a plurality of first RBs corresponding to the at least two available frequency domain resource segments and a plurality of second RBs in the at least two available frequency domain resource segments.

In the first aspect to the fourth aspect, in the joint interleave mapping, except the start RB bundle of an available frequency domain resource segment with a lowest frequency in the at least two available frequency domain resource segments, a plurality of first RBs included in an RB bundle with a size less than a preset size of an RB bundle in the VRB are placed at the last location of the VRB in ascending order of frequencies. Each RB bundle includes at least one RB.

In this application, the foregoing joint interleave mapping may be used, so that the RBs allocated to the UE are more evenly dispersed in the PRB, and the UE obtains a greater frequency domain selective gain.

According to a fifth aspect, a communications device is provided. The communications device may include a processor and a memory coupled and connected to the processor. The memory may be configured to store a computer instruction. When the communications device runs, the processor executes the computer instruction stored in the memory, so that the communications device performs the frequency domain resource allocation method in the first aspect or any possible implementation of the first aspect.

According to a sixth aspect, a computer readable storage medium is provided. The computer readable storage medium may include a computer instruction. When the computer instruction is run on a computer, a communications device performs the frequency domain resource allocation method in the first aspect or any possible implementation of the first aspect.

According to a seventh aspect, a computer program product including a computer instruction is provided. When the computer program product runs on a computer, a communications device performs the frequency domain resource allocation method in the first aspect or any possible implementation of the first aspect.

According to an eighth aspect, a communications device is provided. The communications device may include a processor and a memory coupled and connected to the processor. The memory may be configured to store a computer instruction. When the communications device runs, the processor executes the computer instruction stored in the memory, so that the communications device performs the frequency domain resource allocation method in the second aspect or any possible implementation of the second aspect.

According to a ninth aspect, a computer readable storage medium is provided. The computer readable storage medium may include a computer instruction. When the computer instruction is run on a computer, a communications device performs the frequency domain resource allocation method in the second aspect or any possible implementation of the second aspect.

According to a tenth aspect, a computer program product including a computer instruction is provided. When the computer program product runs on a computer, a communications device performs the frequency domain resource allocation method in the second aspect or any possible implementation of the second aspect.

According to an eleventh aspect, a communications system is provided. The communications system may include the communications device in the third aspect or any possible implementation of the third aspect, and the communications device in the fourth aspect or any possible implementation of the fourth aspect.

Alternatively, the communications system may include the communications device in the fifth aspect and the communications device in the eighth aspect.

For descriptions of related content and technical effects of the fifth aspect to the eleventh aspect, refer to related descriptions of the related content and the technical effects of the first aspect to the fourth aspect. Details are not described herein again.

DESCRIPTION OF EMBODIMENTS

Figure 1:
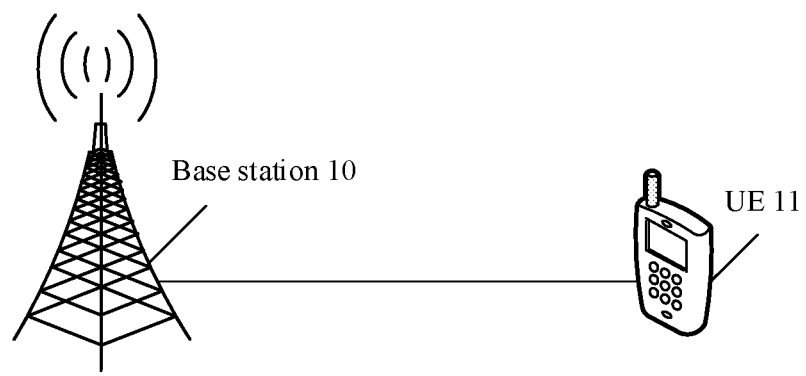
FIG. 1 is a schematic architectural diagram of a communications system according to an embodiment.

The term "and/or" in this specification describes only an association relationship for describing associated objects and represents that three relationships may exist. For example, A and/or B may represent the following three cases: Only A exists, both A and B exist, and only B exists.

In addition, in the discussed embodiments, the word "example" or "for example" is used to represent giving an example, an illustration, or a description. Any embodiment or design scheme described as an "example" or "for example" in the embodiments should not be explained as being more preferred or having more advantages than another embodiment or design scheme. Exactly, use of the word "example" or "for example" or the like is intended to present a relative concept in a specific manner.

In the description of the embodiments, unless otherwise stated, "a plurality of" means two or more than two. For example, a plurality of processing units indicate two or more processing units, and a plurality of systems indicate two or more systems.

The following explains and describes some concepts in a frequency domain resource allocation method and apparatus provided in various embodiments.

BWP: For a 5G system, an ultra 4G system, or a post-LTE system, a plurality of BWPs may be supported. In other words, one system bandwidth may be divided into a plurality of BWPs (which may be considered as a plurality of narrow bandwidths). A base station may configure a plurality of BWPs for UE, and activate one or more BWPs for the UE to transmit data. In other words, the one or more activated BWPs are an operating bandwidth of the UE. For example, a total bandwidth (which may be referred to as a system bandwidth) of a cell in which the UE operates is 100 M (megabytes), and the operating bandwidth of the UE may be relatively small, for example, 20 M. In this case, for a base station for the cell, the base station may allocate 20 M from the 100-M bandwidth as the operating bandwidth of the UE. The operating bandwidth may be referred to as a BWP or a carrier BWP, and the BWP and the carrier BWP have a same physical meaning. For example, for a 100-M system bandwidth, the 100-M system bandwidth may be divided into a 20-M BWP 1, a 30-M BWP 2, and a 50-M BWP 3 according to a numerology (including a series of parameters such as a subcarrier spacing, a symbol length, and a length of a cyclic prefix of a symbol).

Frequency domain resource: A unit of a frequency domain resource is a subcarrier, a subband, an RB, an RBG, or the like. For example, a resource unit for allocating the frequency domain resource is an RB. The RB includes an RB in a PRB and an RB in a VRB. One PRB includes 12 consecutive subcarriers. In a frequency domain resource of a cell, which may also be referred to as a component carrier CC), a subcarrier with a lowest frequency is denoted as a subcarrier 0, and an RB including the subcarrier 0 is denoted as a CRB 0 (that is, a common RB 0). During frequency domain resource allocation, the subcarrier 0 and the CRB 0 have a function as a reference point.

In one or more embodiments, the frequency domain resource may be divided into a plurality of frequency domain resource units. For example, the frequency domain resource unit is an RB, an RBG, an RB bundle, or the like. One RBG includes a plurality of RBs. One RB bundle includes a plurality of RBs. An index value of each frequency domain resource unit may indicate a frequency domain resource. For example, it is assumed that a BWP is divided into 10 RBGs. Correspondingly, in frequency domain, an index value of each RBG may indicate a frequency domain resource.

According to a problem existing in the background, according to the frequency domain resource allocation method and apparatus provided in some embodiments, a base station may configure frequency domain resources for UE, where the frequency domain resources include at least one available frequency domain resource segment and at least one unavailable frequency domain resource segment; and then the base station sends frequency domain resource indication information to the UE, where the frequency domain resource indication information is used to indicate a frequency domain resource that is in the at least one available frequency domain resource segment of the frequency domain resources configured for the UE and that is used by the UE to transmit data, and the frequency domain resource indication information no longer indicates a frequency domain resource in the at least one unavailable frequency domain resource segment. Therefore, a quantity of bits of DCI used by the base station to send the frequency domain resource indication information to the UE can be reduced, thereby reducing signaling overheads required for allocating the frequency domain resources to the UE.

The frequency domain resource allocation method and apparatus provided in the embodiments may be applied to a wireless communications system. The wireless communications system may be an LTE system, an LTE-Advanced (LTE-A) system, an NR system (i.e., a 5G system), or the like. An example in which the wireless communications system provided in the embodiments is an NR system is used. FIG. 1 is a schematic architectural diagram of an NR system according to an embodiment. In FIG. 1, the NR system includes a base station 10 and UE 11. The base station 10 may configure BWPs with different bandwidth sizes for the UE, and may allocate frequency domain resources in the BWPs to the UE 11 by using DCI, so that the UE 11 transmits downlink data and uplink data on the frequency domain resources allocated by the base station 10.

Figure 2:
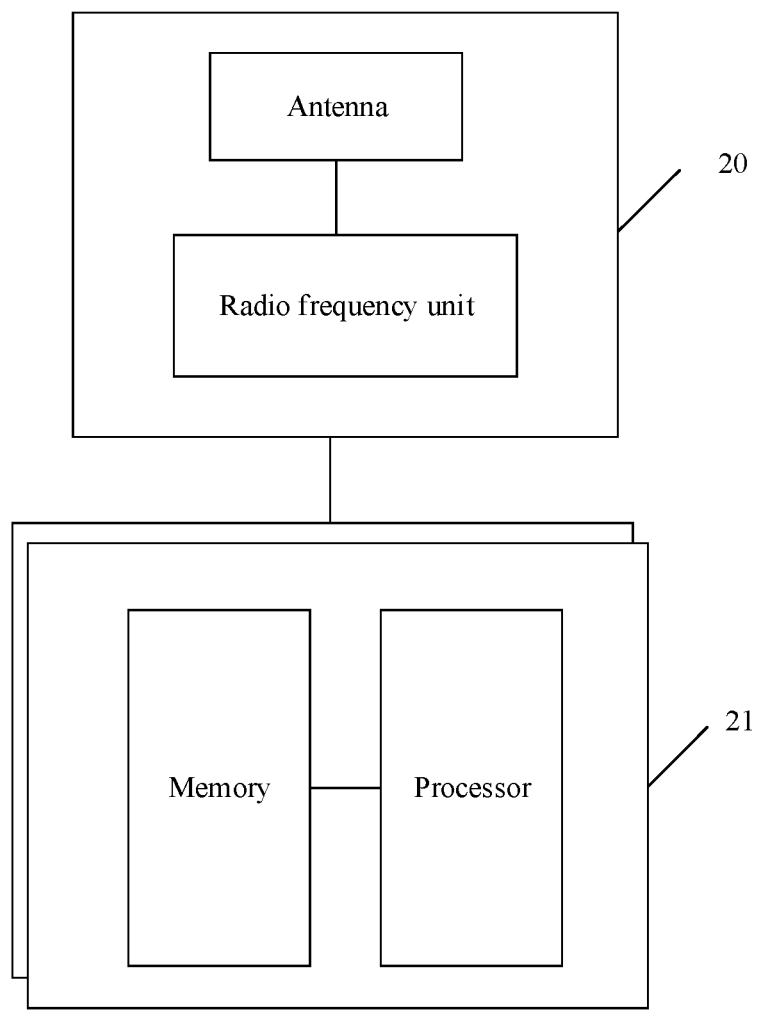
FIG. 2 is a schematic hardware diagram of a base station according to an embodiment.

In this embodiment of the present invention, the base station allocating the frequency domain resources to the UE may be a device such as a common base station, an evolved nodeB (eNB), a next-generation nodeB in a 5G system (gNB), a new radio nodeB (new radio eNB), a macro base station, a micro base station, a high-frequency base station, or a transmission/reception point (TRP). For example, in this embodiment, the common base station is used as an example to describe a hardware structure of the base station. The following describes components of the base station provided in this embodiment in detail with reference to FIG. 2. As shown in FIG. 2, the base station provided in this embodiment may include a part 20 and a part 21. The part 20 is mainly configured to: receive and transmit a radio frequency signal, and perform conversion between a radio frequency signal and a baseband signal. The part 21 is mainly configured to: perform baseband processing, control the base station, and the like. The part 20 may be usually referred to as a transceiver unit, a transceiver, a transceiver circuit, a transceiver, or the like. The part 21 is usually a control center of the base station, and may be usually referred to as a processing unit.

The transceiver unit in the part 20 may also be referred to as a transceiver, or the like. The transceiver unit includes an antenna and a radio frequency unit, or includes only a radio frequency unit or a part of a radio frequency unit. The radio frequency unit is mainly configured to perform radio frequency processing. Optionally, in the part 20, a component configured to implement a receiving function may be considered as a receiving unit, and a component configured to implement a sending function may be considered as a sending unit. In other words, the part 20 includes the receiving unit and the sending unit. The receiving unit may also be referred to as a receiver, a receiver circuit, or the like, and the sending unit may be referred to as a transmitter, a transmitter circuit, or the like.

The 21 part may include one or more boards or chips. Each board or chip may include one or more processors and one or more memories. The processor is configured to read and execute a program in the memory, to implement a baseband processing function and control the base station. If a plurality of boards exist, the boards may be interconnected to increase a processing capability. In an optional implementation, alternatively, the plurality of boards may share one or more processors, or the plurality of boards share one or more memories. The processor and the memory may be integrated together, or may be disposed separately. In some embodiments, the part 20 and the part 21 may be integrated together, or may be disposed separately. In addition, all functions of the part 21 may be integrated in a chip for implementation; or some functions may be integrated in a chip for implementation, and the other functions may be integrated in other one or more chips for implementation. This is not limited in this embodiment.

In this embodiment, the UE may be a mobile phone, a tablet computer, a notebook computer, an ultra-mobile personal computer (UMPC), a netbook, a personal digital assistant (PDA), an intelligent car, a sensing device, an Internet of things (IOT) device, customer-premises equipment (CPE), or the like.

Figure 3:
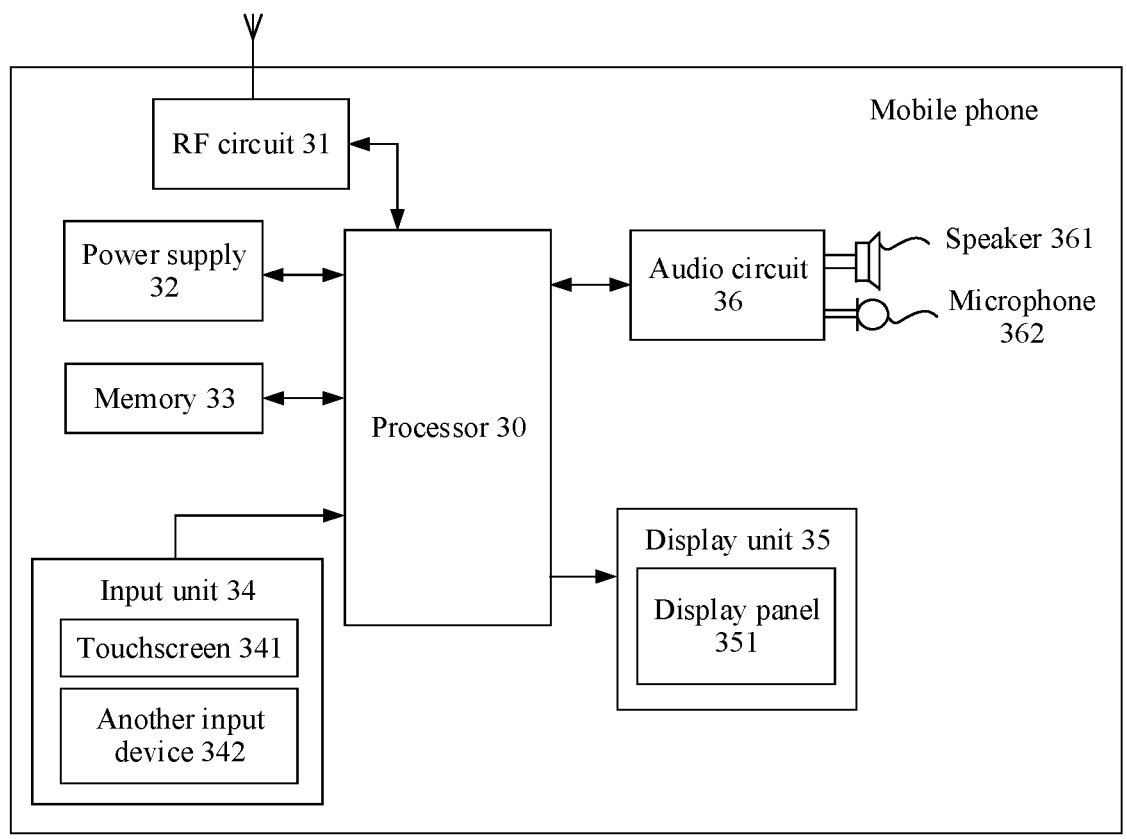
FIG. 3 is a schematic hardware diagram of a mobile phone according to an embodiment.

For example, in this embodiment, an example in which the UE is a mobile phone is used to describe a hardware structure of the UE. The following describes components of the mobile phone provided in this embodiment in detail with reference to FIG. 3. As shown in FIG. 3, the mobile phone provided in this embodiment includes components such as a processor 30, a radio frequency (RF) circuit 31, a power supply 32, a memory 33, an input unit 34, a display unit 35, and an audio frequency circuit 36. A person skilled in the art may understand that a structure of the mobile phone shown in FIG. 3 does not constitute any limitation on the mobile phone, and the mobile phone may include more or fewer components than those shown in FIG. 3, or may include a combination of some of the components shown in FIG. 3, or may include components arranged differently from those shown in FIG. 3.

The processor 30 is a control center of the mobile phone, and is connected to all parts of the entire mobile phone by using various interfaces and lines. The processor 30 performs various functions of the mobile phone and processes data by running or executing a software program and/or a software module stored in the memory 33 and invoking data stored in the memory 33, to perform overall monitoring on the mobile phone. Optionally, the processor 30 may include one or more processing units. Optionally, an application processor and a modem processor may be integrated into the processor 30. The application processor mainly processes an operating system, a user interface, an application program, and the like. The modem processor mainly processes wireless communication. It may be understood that the modem processor may alternatively be a processor separated from the processor 30.

The RF circuit 31 may be configured to receive and send a signal in an information receiving and transmitting process or in a call process. For example, after receiving downlink information from a base station, the RF circuit 31 sends the downlink information to the processor 30 for processing, and sends uplink data to the base station. Generally, the RF circuit includes but is not limited to an antenna, at least one amplifier, a transceiver, a coupler, a low noise amplifier (LNA), a duplexer, and the like. In addition, the mobile phone may further implement wireless communication with another device in a network by using the RF circuit 31. The wireless communication may use any communications standard or protocol, including but not limited to a global system for mobile communications (GSM), a general packet radio service (GPRS), code division multiple access (CDMA), wideband code division multiple access (WCDMA), LTE, an e-mail, a short message service (SMS), and the like.

The power supply 32 may be configured to supply power to each component of the mobile phone. The power supply 32 may be a battery. Optionally, the power supply may be logically connected to the processor 30 by using a power management system, to implement functions such as charging management, discharging management, and power consumption management by using the power management system.

The memory 33 may be configured to store a software program and/or a software module. The processor 30 performs various function applications of the mobile phone and processes data by running the software program and/or the software module stored in the memory 33. The memory 33 may mainly include a program storage region and a data storage region. The program storage region may store an operating system, an application program required by at least one function (for example, a sound play function or an image play function), and the like. The data storage region may store data (for example, audio data, image data, or an address book) created according to use of the mobile phone. In addition, the memory 33 may include a high-speed random access memory, and may further include a non-transitory memory, for example, at least one magnetic disk storage component, a flash memory component, or another non-transitory solid-state storage component.

The input unit 34 may be configured to: receive input digital or character information, and generate key signal input related to user setting and function control of the mobile phone. For example, input unit 34 may include a touchscreen 341 and another input device 342. The touchscreen 341 is also referred to as a touch panel. The touchscreen 341 may collect a touch operation performed by a user on or near the touchscreen 341 (for example, an operation performed by the user on the touchscreen 341 or near the touchscreen 341 by using any appropriate object or accessory such as a finger or a stylus), and drive a corresponding connected apparatus according to a preset program. Optionally, the touchscreen 341 may include two parts: a touch detection apparatus and a touch controller. The touch detection apparatus detects a touch location of the user, detects a signal brought by a touch operation, and delivers the signal to the touch controller. The touch controller receives touch information from the touch detection apparatus, converts the touch information into touch point coordinates, and sends the touch point coordinates to the processor 30. In addition, the touch controller can receive and execute a command sent by the processor 30. In addition, the touchscreen 341 may be implemented in a plurality of types, for example, a resistive type, a capacitive type, an infrared type, and a surface acoustic wave type. The another input device 342 may include but is not limited to one or more of a physical keyboard, a function button (for example, a volume control button or an on/off button), a trackball, a mouse, a joystick, and the like.

The display unit 35 may be configured to display information entered by the user or information provided for the user, and various menus of the mobile phone. The display unit 35 may include a display panel 351. Optionally, the display panel 351 may be configured in a form of a liquid crystal display (LCD), an organic light-emitting diode (OLED), or the like. Further, the touchscreen 341 may cover the display panel 351. After detecting a touch operation performed on or near the touchscreen 341, the touchscreen 341 delivers the touch operation to the processor 30 to determine a type of a touch event, and then the processor 30 provides corresponding visual output on the display panel 351 according to the type of the touch event. Although the touchscreen 341 and the display panel 351 serve as two independent components in FIG. 3 to implement input and output functions of the mobile phone, in some embodiments, the touchscreen 341 and the display panel 351 may be integrated to implement the input and output functions of the mobile phone.

The audio frequency circuit 36, a speaker 361, and a microphone 362 are configured to provide an audio interface between the user and the mobile phone. The audio frequency circuit 36 may transmit an electrical signal converted from received audio data to the loudspeaker 361, and the loudspeaker 361 converts the electrical signal into a sound signal for output. In addition, the microphone 362 converts a collected sound signal into an electrical signal. The audio circuit 36 receives the electrical signal; converts the electrical signal into audio data; and then outputs the audio data to the RF circuit 31 by using the processor 30 to send the audio data to, for example, another mobile phone, or outputs, to the memory 33 for further processing, the audio data by using the processor 30.

Optionally, the mobile phone shown in FIG. 3 may further include various sensors, for example, a gyroscope sensor, a hygrometer sensor, an infrared sensor, and a magnetometer sensor. Details are not described herein.

Optionally, the mobile phone shown in FIG. 3 may further include a Wi-Fi module, a Bluetooth module, and the like. Details are not described herein.

Figure 4:
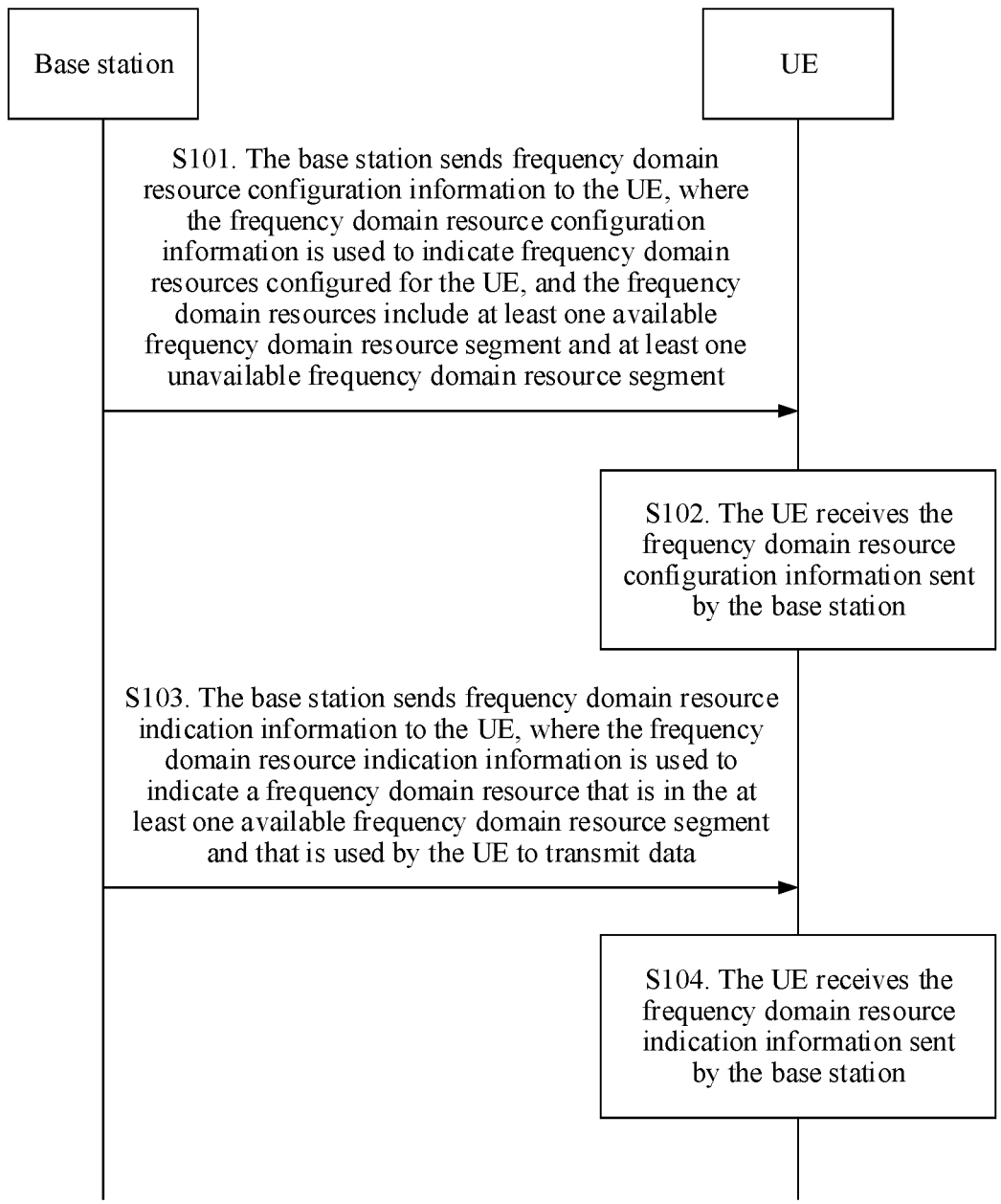
FIG. 4 is a schematic diagram of a frequency domain resource allocation method according to an embodiment.

With reference to FIG. 1, as shown in FIG. 4, a frequency domain resource allocation method provided in an embodiment includes step S101 to step S104.

S101. A base station sends frequency domain resource configuration information to UE, where the frequency domain resource configuration information is used to indicate frequency domain resources configured for the UE, and the frequency domain resources include at least one available frequency domain resource segment and at least one unavailable frequency domain resource segment.

The available frequency domain resource segment includes consecutive frequency domain resources (e.g., consecutive RBs).

In this embodiment, in a process in which the base station configures the frequency domain resources for the UE, the frequency domain resources configured by the base station for the UE may be a plurality of BWPs, and the base station may activate frequency domain resources of one or more BWPs, so that the base station allocates a frequency domain resource from the activated BWPs (active BWP) that is used by the UE to transmit data.

Optionally, the base station may configure a plurality of BWPs for the UE by using one piece of signaling, and indicate at least one activated BWP in the plurality of BWPs. Alternatively, the base station may configure a plurality of BWPs by using one piece of signaling, and indicate at least one activated BWP in the plurality of BWPs by using another piece of signaling. This is not limited in this embodiment.

It should be noted that, in this embodiment, the frequency domain resources configured by the base station are activated frequency domain resources and can be used by the UE, that is, the one or more activated BWPs.

In this embodiment, the at least one available frequency domain resource segment includes at least one of the following: at least two BWPs, or at least one AS in at least one BWP.

The at least one unavailable frequency domain resource segment includes at least one of the following: at least one frequency domain resource segment other than the at least two BWPs, or at least one frequency domain resource segment other than the at least one AS in the at least one BWP.

Figure 5A:
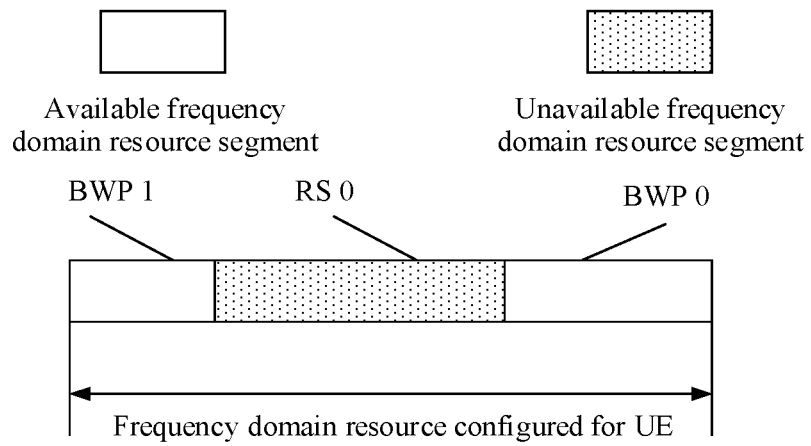
FIG. 5(a) and FIG. 5(b) are a schematic diagram of frequency domain resources configured by a base station for UE according to an embodiment.
Figure 5B:
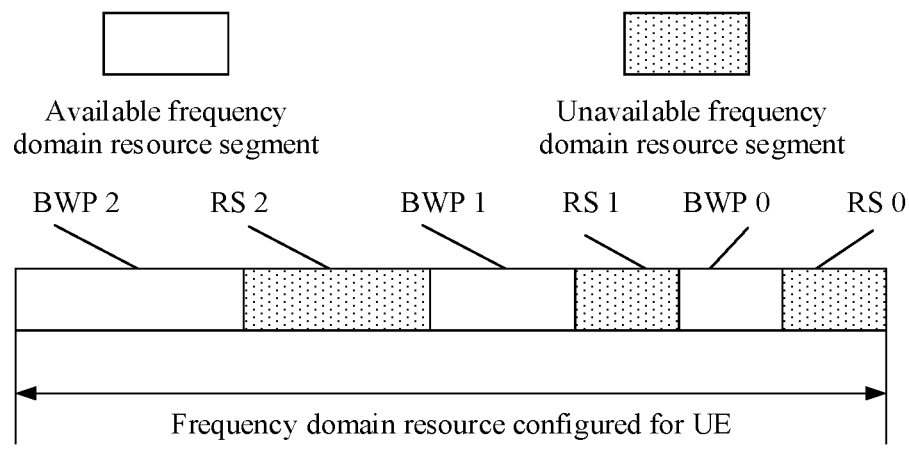

If the frequency domain resources configured by the base station for the UE include the plurality of BWPs, the plurality of BWPs are the available frequency domain resource segment, each BWP includes consecutive RBs, and an unavailable frequency domain resource segment exists between adjacent BWPs in the plurality of BWPs. For example, FIG. 5 is a schematic diagram of frequency domain resources configured by a base station for UE. FIG. 5 includes two examples of the frequency domain resources configured for the UE, which are respectively (a) and (b) in FIG. 5. In (a) in FIG. 5, the frequency domain resources configured by the base station for the UE include two available frequency domain resource segments and one unavailable frequency domain resource segment. The available frequency domain resource segments are a BWP 0 and a BWP 1, and the unavailable frequency domain resource segment is an RS 0. In (b) in FIG. 5, the BWP includes three available frequency domain resource segments and three unavailable frequency domain resource segments. The available frequency domain resource segments are a BWP 0, a BWP 1, and a BWP 2, and the unavailable frequency domain resource segments are an RS 0, an RS 1, and an RS 2.

If the frequency domain resource configured by the base station for the UE is one BWP, the BWP includes at least one AS and at least one unavailable frequency domain resource segment, and one AS includes a plurality of consecutive RBs.

Figure 6A:
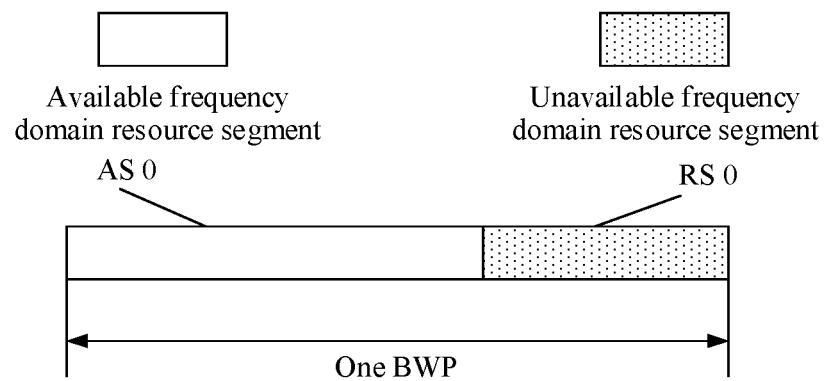
FIG. 6(a), FIG. 6(b), and FIG. 6(c) are a schematic diagrams of frequency domain resources configured by a base station for UE according to an embodiment.
Figure 6B:
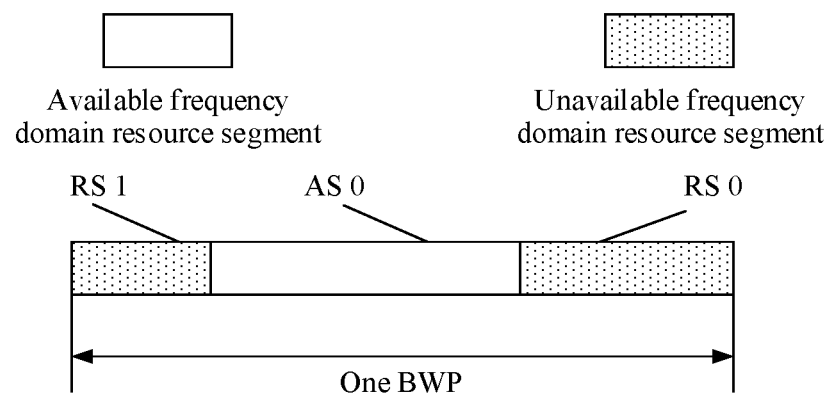
Figure 6C:
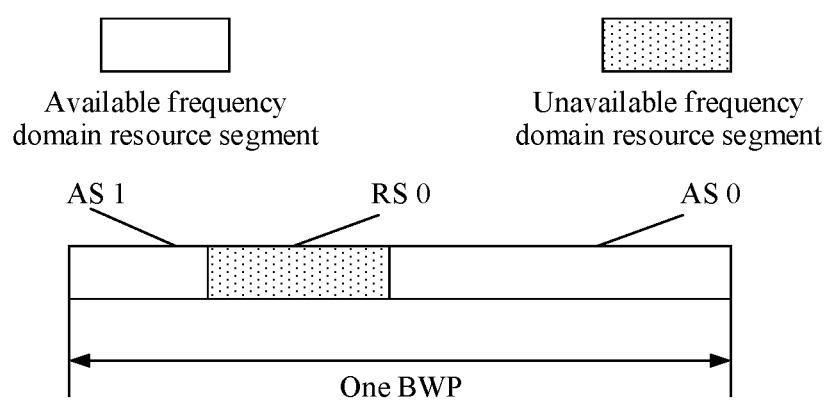

For example, the frequency domain resources configured by the base station for the UE are one BWP. FIG. 6 is a schematic diagram of frequency domain resources configured by a base station for UE. FIG. 6 includes three examples of frequency domain resources configured for the UE, which are respectively (a), (b), and (c) in FIG. 6. In (a) in FIG. 6, the BWP includes one available frequency domain resource segment and one unavailable frequency domain resource segment, where the available frequency domain resource segment is an AS 0, and the unavailable frequency domain resource segment is an RS 0. In (b) in FIG. 6, the BWP includes one available frequency domain resource segment and two unavailable frequency domain resource segments, where the available frequency domain resource segment is an AS 0, and the unavailable frequency domain resource segments are an RS 0 and an RS 2. In (c) in FIG. 6, the BWP includes two available frequency domain resource segments and one unavailable frequency domain resource segment, where the available frequency domain resource segments are an AS 0 and an AS 2, and the unavailable frequency domain resource segment is an RS 0. Alternatively, the two cases in FIG. 5 and FIG. 6 may be combined for use.

In this embodiment, in the process in which the base station configures the frequency domain resources for the UE, the base station may first send, to the UE, the resource configuration information including a frequency domain range, and then the base station sends, to the UE, indication information that indicates an unavailable frequency domain resource in the frequency domain range. For example, when the base station configures a BWP for the UE, the base station may first send a frequency domain range of the BWP to the UE, and then the base station sends, to the UE, indication information that indicates an unavailable frequency domain resource segment in the BWP, so that the UE can learn which frequency domain resource segment is an available frequency domain resource segment and which frequency domain resource segment is an unavailable frequency domain resource segment. In this way, after the UE receives the frequency domain resource configuration information sent by the base station, when the UE can transmit data by using some of the configured frequency domain resources, the UE transmits the data by using a frequency domain resource in the available frequency domain resource segment and avoids the unavailable frequency domain resource segment.

S102. The UE receives the frequency domain resource configuration information sent by the base station.

For a description related to the frequency domain resource configuration information, refer to the foregoing specific description of step S101. Details are not described herein again.

S103. The base station sends frequency domain resource indication information to the UE, where the frequency domain resource indication information is used to indicate a frequency domain resource that is in the at least one available frequency domain resource segment and that is used by the UE to transmit data.

The frequency domain resource indication information of the base station may be carried in DCI. For example, the base station may send the frequency domain resource indication information to the UE by using the DCI, to schedule a downlink data channel (PDSCH) or an uplink data channel (PUSCH) for the UE to transmit downlink data or uplink data. It may be understood that the data transmission performed by the UE mentioned in this embodiment includes data receiving or data sending, that is, at least one of a process in which the UE receives downlink data or a process in which the UE sends uplink data.

In this embodiment, after the base station sends the frequency domain resource configuration information to the UE to complete configuring the frequency domain resources for the UE, the base station may allocate, to the UE from the frequency domain resources configured for the UE, the frequency domain resource used by the UE to transmit data.

In the process in which the base station sends the resource indication information to the UE, the base station may first generate the frequency domain resource indication information. The frequency domain resource indication information is generated according to the at least one available frequency domain resource segment in the frequency domain resources configured for the UE. For example, when the frequency domain resources configured for the UE are one BWP, the frequency domain resource indication information is generated according to frequency domain resources including all ASs in the BWP. When the frequency domain resources configured for the UE are at least two BWPs (an unavailable frequency domain resource segment exists between the at least two BWPs), the frequency domain resource indication information is generated according to frequency domain resources including the at least two BWPs. It can be learned that the frequency domain resource indication information no longer indicates a frequency domain resource in the at least one unavailable frequency domain resource segment. Therefore, a quantity of bits of the DCI used by the base station to send the frequency domain resource indication information to the UE can be reduced, thereby reducing signaling overheads required for allocating the frequency domain resources to the UE.

Optionally, in this embodiment, a manner of allocating frequency domain resources to the UE may include a frequency domain resource allocation manner 0 and a frequency domain resource allocation manner 1. For different frequency domain resource allocation manners, the base station generates different frequency domain resource indication information. The following separately describes the two frequency domain resource allocation manners in detail.

In the frequency domain resource allocation manner 0, the base station indicates in a unit of an RBG whether each RBG included in the at least one available frequency domain resource segment is allocated to the UE. In some embodiments, frequency domain resource information may include RBG indication information. The RBG indication information is used to indicate that at least one RBG in $N_{RBG}$ RBGs is a frequency domain resource used by the UE to transmit data. In other words, the at least one RBG is allocated to the UE. Herein, $N_{RBG}$ is a total quantity of RBGs included in the at least one available frequency domain resource segment.

When the frequency domain resources are allocated to the UE in the frequency domain resource allocation manner 0, the method of generating the frequency domain resource indication information by the base station may include step S201 and step S202.

S201. The base station determines the total quantity of RBGs included in the at least one available frequency domain resource segment.

S202. The base station generates the frequency domain resource indication information according to the total quantity of RBGs.

Figure 7:
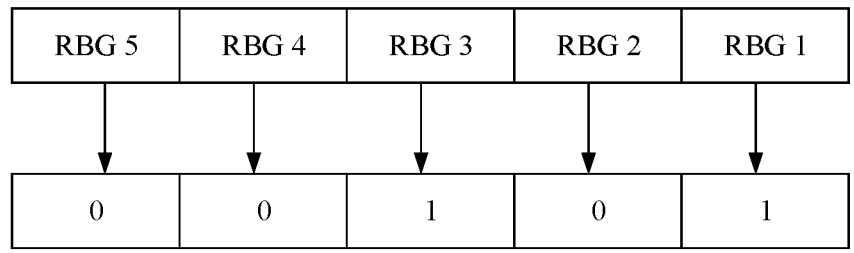
FIG. 7 is a schematic diagram of a frequency domain resource allocation result according to an embodiment.

In this embodiment, after determining the total quantity $N_{RBG}$ of RBGs included in the at least one available frequency domain resource segment, the base station may use $N_{RBG}$-bit indication information to indicate an RBG that is to be allocated to the UE and an RBG that is not allocated to the UE. For example, "1" is used to indicate that a corresponding RBG is allocated to the UE, and "0" is used to indicate that a corresponding RBG is not allocated to the UE. If $N_{RBG}$ is 5, the RBGs are respectively denoted as an RBG 1, an RBG 2, an RBG 3, an RBG 4, and an RBG 5. The base station determines to allocate the RBG 1 and the RBG 3 to the UE, and not to allocate the RBG 2, the RBG 4, and the RBG 5 to the UE. As shown in FIG. 7, the RBG 1, the RBG 2, the RBG 3, the RBG 4, and the RBG 5 are sorted from right to left in ascending order of frequencies. In this case, indication information for the RBGs is 00101.

Step S201 may be implemented by using step S201a and step S201b.

S201a. The base station determines a quantity of RBGs included in each of the at least one available frequency domain resource segment.

Optionally, in this embodiment, the quantity of RBGs included in any one of the at least one available frequency domain resource segment may be calculated by using the following method 1 or method 2.

When the base station uses the method 1 to determine the quantity of RBGs included in each of the at least one available frequency domain resource segment, the quantity of RBGs included in any available frequency domain resource segment i in the at least one available frequency domain resource segment meets: $N_{RBG, R_i} = \lceil M_{RB, R_i}/P \rceil$ where $M_{RB, R_i}$ is a quantity of RBs included in the available frequency domain resource segment i, P is a quantity of RBs included in one RBG, $\lceil \ \rceil$ represents rounding up, and i is a natural number.

In this embodiment, the at least one available frequency domain resource segment may be numbered in ascending order of frequencies of frequency domain resources. The number may be considered as an index of the available frequency domain resource segment. For example, if one BWP includes five ASs, the five ASs may be denoted as an AS 0, an AS 1, an AS 2, an AS 3, and an AS 4.

In this embodiment, one RBG may include a plurality of consecutive RBs. In a related protocol of a 5G system, a set of values defining RBG sizes (which may also be referred to as a preset RBG size, that is, a quantity of RBs included in one RBG) is {2, 4, 8, 16}.

Likewise, in this embodiment, predefined frequency domain resource units may be numbered in ascending order of frequencies of frequency domain resources. The number is an index of the frequency domain resource unit. For example, the frequency domain resource unit is an RB, and RBs may be an RB0, an RB1, an RBi, and the like in ascending order of frequencies.

In a 5G system, a frequency domain resource may be divided according to an RBG grid (i.e., divided into a plurality of RBGs). If it is not limited to count the RBG grid from a common RB 0, the quantity of RBGs included in each available frequency domain resource segment may be calculated by using the formula:

$$N_{RBG, R_i} = \lceil M_{RB, R_i}/P \rceil.$$

Figure 8:
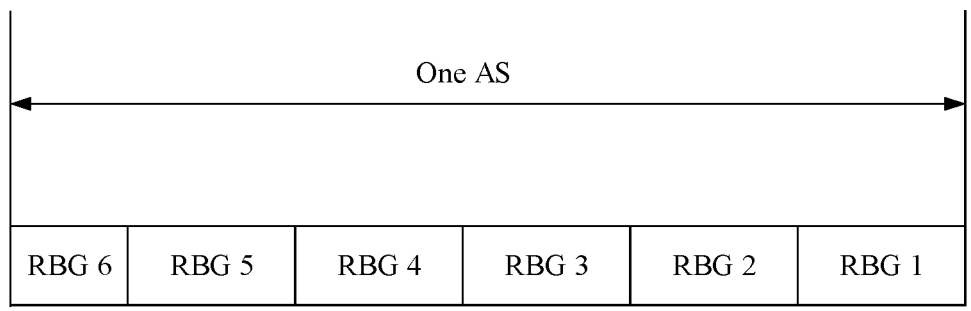
FIG. 8 is a schematic diagram of RBGs included in an AS according to an embodiment.

If the frequency domain resources configured for the UE are one BWP, the at least one available frequency domain resource segment is at least one AS. In the foregoing formula, $M_{RB, R_i}$ is a quantity of RBs included in one AS. For example, it is assumed that one AS in one BWP includes 22 RBs, and it is specified in a protocol that a size of one RBG is 4. In this case, a quantity of RBGs included in the AS is 6, that is, the AS includes six RBGs. FIG. 8 is a schematic diagram of RBGs included in an AS. Table 1 is an example of a size of each of the RBGs included in the AS.

TABLE 1

| RBG | RBG size |
| --- | --- |
| First RBG | 4 |
| Second RBG | 4 |
| Third RBG | 4 |
| Fourth RBG | 4 |
| Fifth RBG | 4 |
| Sixth RBG | 2 |

With reference to FIG. 8 and Table 1, it can be learned that sizes of first five RBGs are equal to the RBG size specified in the protocol, and a size of the last RBG is less than the RBG size specified in the protocol.

Likewise, if the frequency domain resources configured for the UE are in at least two BWPs, the at least one available frequency domain resource segment includes the at least two BWPs. In the foregoing formula, $M_{RB, R_i}$ is a quantity of RBGs included in one BWP.

S201b. The base station calculates a sum of quantities of RBGs included in the at least one available frequency domain resource segment.

In this embodiment, the total quantity of RBGs included in the at least one available frequency domain resource segment meets:

$$N_{RBG} = \sum_{i=0}^{K} N_{RBG,R_i},$$

where $N_{RBG}$ is the total quantity of RBGs, $N_{RBG, R_i}$ is a quantity of RBGs included in a frequency domain resource segment i, and a quantity of available frequency domain resource segments included in the at least one available frequency domain resource segment is K+1.

It should be noted that: when a frequency domain resource in one BWP is allocated to the UE, a quantity of ASs included in the BWP is K+1, and K≥0; or when a frequency domain resource in K+1 BWPs is allocated to the UE, K≥1.

The quantity that is of RBGs included in each of the at least one available frequency domain resource segment and that is determined by the base station by using the method 2 meets: $N_{RBG, R_i} = \lceil (M_{RB, R_i} - M_{RB, R_i, start})/P \rceil + 1$, where $M_{RB, R_i}$ is a quantity of RBs included in an available frequency domain resource segment i, $M_{RB, R_i, start}$ is a quantity of RBs included in the start RBG in the available frequency domain resource segment i, $M_{RB, R_i, start} = P - Q_{R_i, RB}$ mod P, $Q_{R_i, RB}$ is an RB index corresponding to the start RB in the available frequency domain resource segment i, P is a quantity of RBs included in one RBG, ⌈ ⌉ represents rounding up, mod represents a modulo operation, and i is a natural number.

In this embodiment, if it is specified that an RBG grid is counted from a common RB 0, the quantity of RBGs included in each available frequency domain resource segment may be calculated by using the formula:

$$N_{RBG,R_i} = \lceil (M_{RB,R_i} - M_{RB,R_i,start})/P \rceil + 1.$$

Figure 9:
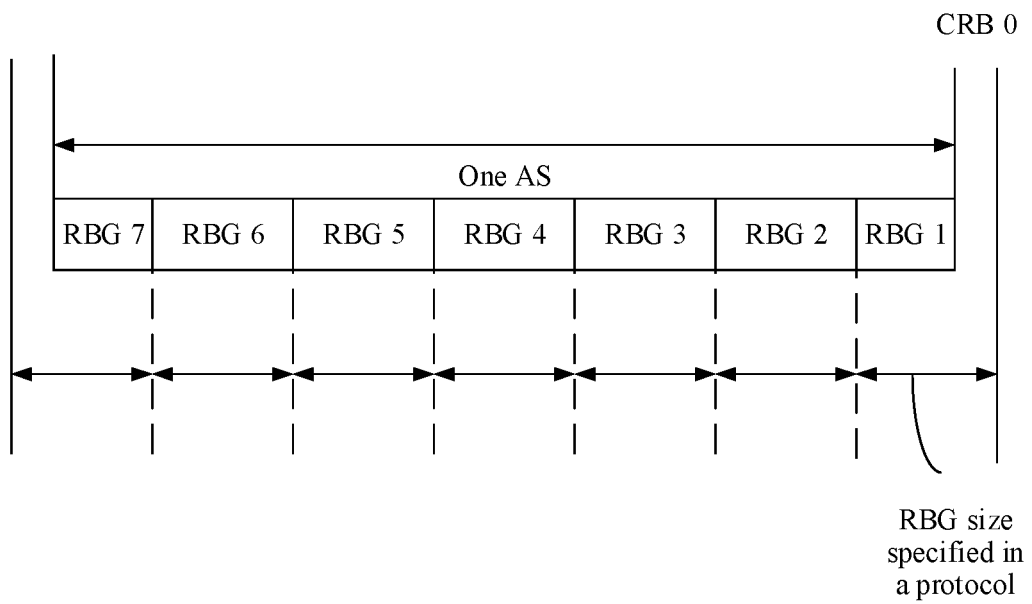
FIG. 9 is a schematic diagram of RBGs included in an AS according to an embodiment.

For example, if the at least one available frequency domain resource segment is at least one AS, in the foregoing formula, $M_{RB, R_i}$ is a quantity of RBs included in one AS, and $M_{RB, R_i, start}$ is a quantity of RBs included in the start RBG in one AS. For example, it is assumed that one AS in one BWP includes 25 RBs; and it is specified in a protocol that a size of one RBG is 4, and an index of the start RB of the AS is 2. In this case, the start RBG of the AS includes two (i.e., 4−2 mod 4) RBs. The AS includes seven (i.e., (25−2)/4)+1 RBGs. FIG. 9 is a schematic diagram of RBGs included in an AS. Table 2 is an example of a size of each of the RBGs included in the AS.

TABLE 2

| RBG | RBG size |
|---|---|
| First RBG | 2 |
| Second RBG | 4 |
| Third RBG | 4 |
| Fourth RBG | 4 |
| Fifth RBG | 4 |
| Sixth RBG | 4 |
| Seventh RBG | 3 |

With reference to FIG. 9 and Table 2, it can be learned that sizes of the first RBG and the last RBG are less than the RBG size specified in the protocol, and sizes of the second RBG to the sixth RBG are equal to the RBG size specified in the protocol.

In the frequency domain resource allocation manner 1, the base station may allocate N consecutive RBs in a VRB to the UE. The frequency domain resource indication information includes an RIV, and the RIV may be used to indicate that N first RBs in the VRB are the frequency domain resource used by the UE to transmit data. In other words, the N first RBs are allocated to the UE. A one-to-one mapping relationship exists between the N first RBs in the VRB and N second RBs in the PRB. The N second RBs are RBs in the at least one available frequency domain resource segment.

When the frequency domain resources are allocated to the UE in the frequency domain resource allocation manner 1, the method of generating the frequency domain resource indication information by the base station may include step S301.

S301. The base station determines an RIV according to an index of the start first RB in a VRB and a quantity of first RBs.

It should be noted that, in this embodiment, the VRB includes a plurality of first RBs, the plurality of first RBs are the frequency domain resource that is allocated to the UE and that is used by the UE to transmit data, the plurality of first RBs correspond to a plurality of second RBs, and the plurality of second RBs correspond to the at least one available frequency domain resource segment.

For example, it is assumed that the base station allocates M RBs (where a quantity of second RBs is M, and a quantity of first RBs is also M) to the UE. The M second RBs are distributed in two available frequency domain resource segments, for example, a first available frequency domain resource segment and a second available frequency domain resource segment. The first available frequency domain resource segment includes M1 second RBs, and the second available frequency domain resource segment includes M2 second RBs, where M1+M2=M. In this case, in the VRB, the first available resource segment may correspond to one VRB subspace (referred to as a first sub_VRB below), and the first sub_VRB includes the M1 first RBs; and the second available frequency domain resource segment may correspond to one VRB subspace (referred to as a second sub_VRB below), and the second sub_VRB includes the M2 first RBs.

In a description of the following embodiment, a VRB corresponding to an available frequency domain resource segment may be understood as at least one sub_VRB corresponding to at least one available frequency domain resource segment, and a quantity of RBs included in one sub_VRB is equal to a quantity of RBs included in one available frequency domain resource segment.

In this embodiment, when the base station allocates the N second RBs in the at least one available frequency domain resource segment to the UE, the N first RBs are allocated to the UE in the corresponding VRB. The frequency domain resource indication information generated by the base station is an RIV indicating the N first RBs. After the UE obtains the RIV, the UE may determine the N second RBs according to the mapping relationship between the N first RBs and the N second RBs. The base station may determine a unique RIV according to the index of the start first RB in the N first RBs (i.e., the beginning first RB in the N first RBs) and the quantity N of first RBs.

In this embodiment, the index of the start first RB is denoted as $P_{RB_{start}}$, the quantity of RBs allocated to the UE (which may also be referred to as a length of the RBs allocated to the UE) is denoted as $L_{RBs}$, and the RIV may be calculated by using the following formula:

When $(L_{RBs}-1) \leq \lfloor N_s/2 \rfloor$, $$RIV = N_s \times (L_{RBs}-1) + P_{RB_{start}}.$$

When $(L_{RBs}-1) > \lfloor N_s/2 \rfloor$, $$RIV = N_s \times (N_s - L_{RBs}+1) + (N_s - 1 - P_{RB_{start}}).$$

Herein, $N_s$ is a total quantity of RBs included in the at least one available frequency domain resource segment.

It should be noted that, in this embodiment, $P_{RB_{start}}$ and $L_{RBs}$ uniquely correspond to one RIV, and one RIV uniquely corresponds to one group of $P_{RB_{start}}$ and $L_{RBs}$.

In this embodiment, in the process of allocating the frequency domain resources to the UE, in the foregoing formula for calculating an RIV, because $N_s$ is the total quantity of RBs included in the at least one available frequency domain resource segment and the $N_s$ RBs do not include an RB included in an unavailable frequency domain resource segment, a value of the RIV is reduced in comparison with the prior art in which the RIV is determined according to $N_s$ of all RBs in an entire BWP. In this way, when the frequency domain resource indication information includes the RIV, signaling overheads required for allocating the frequency domain resources to the UE can be reduced.

Optionally, in this embodiment, the mapping relationship between the N first RBs and the N second RBs may include interleave mapping between the N first RBs and the N second RBs.

The interleave mapping means mapping an RB in a VRB to an RB in a PRB in a unit of an RB bundle. In some embodiments, a frequency domain resource including a plurality of RBs may be divided into a plurality of RB bundles, and one RB bundle includes a plurality of consecutive RBs. For example, one RB bundle may include two or four RBs, and an RB bundle in a VRB corresponds to an RB bundle in a PRB.

It should be noted that, in this embodiment, a method for determining a quantity of RB bundles included in a frequency domain resource segment may be similar to the foregoing method for determining a quantity of RBGs included in a frequency domain resource segment. In other words, a quantity of RBs included in some RB bundles in a frequency domain resource segment may be less than a size of an RB bundle specified in a protocol. For the method for determining a quantity of RB bundles included in a frequency domain resource segment, refer to the foregoing related description of determining a quantity of RBGs included in a frequency domain resource segment. Details are not described herein again.

In this embodiment, if an RB bundle j in the VRB corresponds to an RB bundle f(j) in the PRB, the interleave mapping relationship may be as follows:

$$f(j) = r \times C + c$$

$$j = c \times R + r$$

Herein, $r = 0, 1, \ldots, R-1$, $c = 0, 1, \ldots, C-1$, $C = N_{bundle}/R$, $N_{bundle} = \lceil N_{RB}/L \rceil$, $N_{bundle}$ is a quantity of RB bundles included in a frequency domain resource segment, $N_{RB}$ is a total quantity of RBs included in the frequency domain resource segment, R is a preset configuration parameter ($R \geq 1$), and L is a quantity that is of RBs included in an RB bundle and that is specified in a protocol, that is, a size of an RB bundle.

For example, it is assumed that N is $N_{RB}$, L is 4, and R is 2. It can be learned that C is 5. Table 3 is an example of a correspondence between j and f(j).

TABLE 3

| Value of r | Value of c | j | f(j) |
|---|---|---|---|
| 0 | 0 | 0 | 0 |
| 0 | 1 | 1 | 2 |
| 0 | 2 | 2 | 4 |
| 0 | 3 | 3 | 6 |
| 0 | 4 | 4 | 8 |
| 1 | 0 | 5 | 1 |
| 1 | 1 | 6 | 3 |
| 1 | 2 | 7 | 5 |
| 1 | 3 | 8 | 7 |
| 1 | 4 | 9 | 9 |

With reference to Table 3, RB bundles in a VRB corresponding to an available frequency domain resource segment may be numbered from 0. These RB bundles are respectively denoted as an RB bundle 0, an RB bundle 1, and the like. The foregoing interleave mapping process may comply with a rule of "writing by rows and reading by columns". Herein, "writing by rows" means obtaining an R×C matrix through interleaving, by rows, RB bundles in a VRB corresponding a frequency domain resource segment in ascending order of numbers, that is, a matrix with R rows and C columns. In the foregoing example, the quantity of RB bundles is 10. The 10 RB bundles are respectively denoted as an RB bundle 0 to an RB bundle 9. The following matrix 1 may be obtained through writing by rows in an order from 0 to 9:

$$\begin{bmatrix} 0 & 1 & 2 & 3 & 4 \\ 5 & 6 & 7 & 8 & 9 \end{bmatrix}$$

Figure 10:
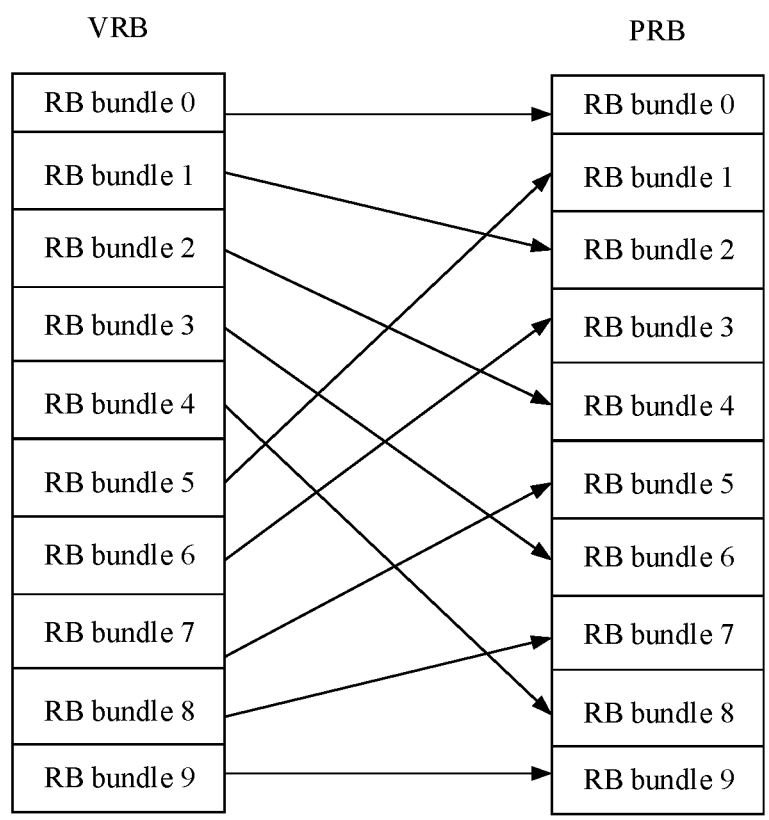
FIG. 10 is a schematic diagram of an interleave mapping result according to an embodiment.

Herein, "reading by columns" means sequentially reading, by columns, elements in the matrix in which RB bundles are interleaved. Therefore, an RB bundle f(j) in a PRB corresponding to an RB bundle j in the VRB may be obtained, and the RB bundles (0, 5, 1, 6, 2, 7, 3, 8, 4, 9) in the VRB sequentially correspond to the RB bundles (0, 1, 2, 3, 4, 5, 6, 7, 8, 9) in the PRB. FIG. 10 is a schematic diagram of an interleaved result between an RB in a VRB and an RB in a PRB. The result is the same as the correspondence shown in Table 3 between the RB bundle j and the RB bundle f(j).

It should be noted that, in this embodiment, if a quantity of PRB bundles included in a frequency domain resource segment is less than R×C, when the matrix 1 is obtained through "writing by rows", elements at remaining locations in the matrix 1 are supplemented by using null, where null indicates that there is no element; and when the UE makes the RB bundle j in the VRB correspond to the RB bundle f(j) in the PRB, that is, in a "reading by columns" process, when an element read by the UE is null, the UE skips the element, that is, does not read the element.

In this embodiment, in the process in which the base station allocates the frequency domain resources to the UE, when the at least one available frequency domain resource segment includes at least two available frequency domain resource segments (for example, the available frequency domain resource segment is at least two ASs, or the available frequency domain resource segment is at least two BWPs), the interleave mapping between the N first RBs and the N second RBs may be independent interleave mapping of each of the at least two available frequency domain resource segments, or the interleave mapping between the N first RBs and the N second RBs may be joint interleave mapping of the at least two available frequency domain resource segments as a whole.

(1) Independent Interleave Mapping

In this embodiment, the independent interleave mapping means interleave mapping between a plurality of first RBs corresponding to each available frequency domain resource segment and a plurality of second RBs in each available frequency domain resource segment, and the independent interleave mapping method is interleave mapping between an RB in a VRB corresponding to a frequency domain resource segment and an RB in a PRB described in the foregoing embodiment. For details, refer to the related description in the foregoing embodiment.

For example, the available frequency domain resource segment is an AS. When the available frequency domain resource segment is two ASs, the two ASs are respectively denoted as an AS 0 and an AS 1. If the AS 0 includes four RB bundles, the AS 1 includes six RB bundles.

The four RB bundles in a sub_VRB corresponding to the AS 0 are written into a 2×2 matrix:

$$\begin{bmatrix} 0 & 1 \\ 2 & 3 \end{bmatrix}$$

It can be learned that the RB bundles (0, 2, 1, 3) in the sub_VRB corresponding to the AS 0 correspond to the RB bundles (0, 1, 2, 3) in the PRB.

The six RB bundles in a sub_VRB corresponding to the AS 1 are written into a 3×2 matrix:

$$\begin{bmatrix} 0 & 1 \\ 2 & 3 \\ 4 & 5 \end{bmatrix}$$

Figure 11A:
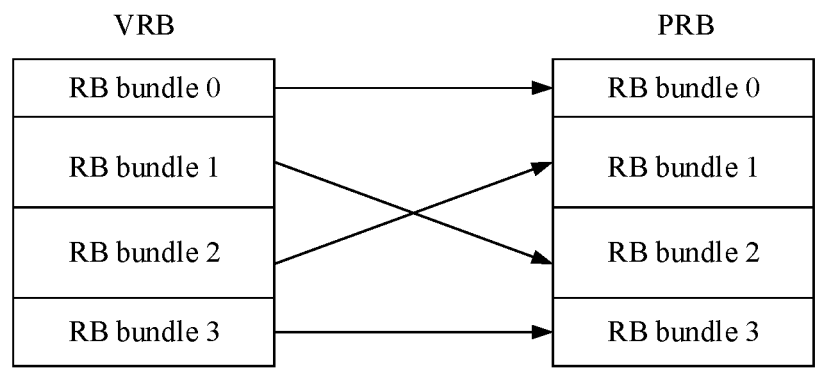
FIG. 11(a) and FIG. 11(b) are a schematic diagram of an independent interleave mapping result according to an embodiment.
Figure 11B:
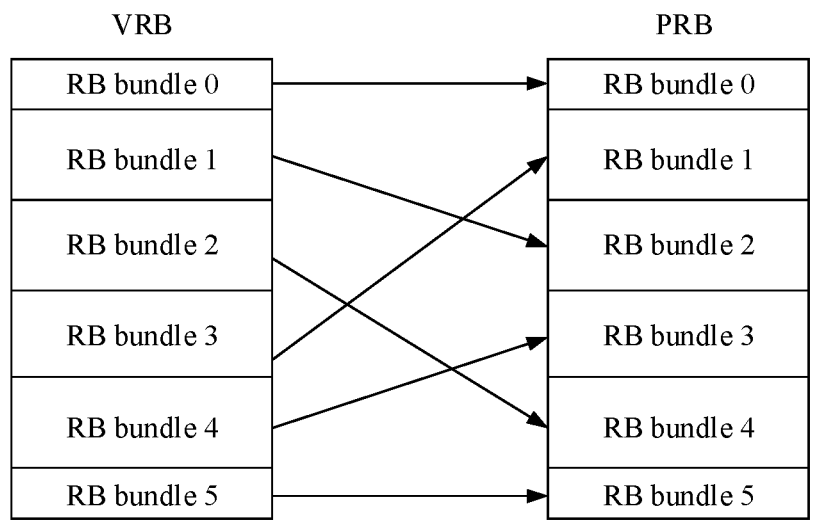

It can be learned that the RB bundles (0, 2, 4, 1, 3, 5) in the sub_VRB corresponding to the AS 1 correspond to the RB bundles (0, 1, 2, 3, 4, 5) in the PRB. FIG. 11 is a schematic diagram of a result of independent interleave mapping of each AS in a BWP. Herein, (a) in FIG. 11 corresponds to an interleave mapping result of an AS 0, and (b) in FIG. 11 corresponds to an interleave mapping result of an AS 1.

(2) Joint Interleave Mapping

In this embodiment, the joint interleave mapping means interleave mapping between a plurality of first RBs corresponding to at least two available frequency domain resource segments and a plurality of second RBs in the at least two available frequency domain resource segments.

Optionally, in this embodiment, in the joint interleave mapping, except the start RB bundle of an available frequency domain resource segment with a lowest frequency in the at least two available frequency domain resource segments, a plurality of first RBs included in an RB bundle with a size less than a preset size of an RB bundle in the VRB are placed at the last location of the VRB in ascending order of frequencies, and then are mapped to a plurality of second RBs. Each RB bundle includes at least one RB.

For example, the foregoing two ASs are still used as an example. The AS 0 includes four RB bundles. The AS 1 includes six RB bundles. Both the start RB bundle and a last RB bundle in the sub_VRB corresponding to the AS 0 are less than a preset RB bundle size, and both the start RB bundle and a last RB bundle in the sub_VRB corresponding to the AS 1 are less than the preset RB bundle size. In an RB bundle shown in the left part of FIG. 12, 10 RB bundles in a VRB are sequentially numbered from an RB bundle 0 to an RB bundle 9 before interleave mapping. It can be learned that, besides the start RB bundle (i.e., the RB bundle 0) in the VRB, an RB bundle 3, an RB bundle 4, and the RB bundle 9 are RB bundles whose sizes are less than a preset RB bundle size. Similarly, in the 10 RB bundles in the PRB, except the start RB bundle (i.e., the RB bundle 0) in the VRB, the RB bundle 3, the RB bundle 4, and the RB bundle 9 are RB bundles whose sizes are less than the preset RB bundle size. The left part of FIG. 12 is equivalent to a VRB that is directly formed through mapping without interleaving.

Figure 12:
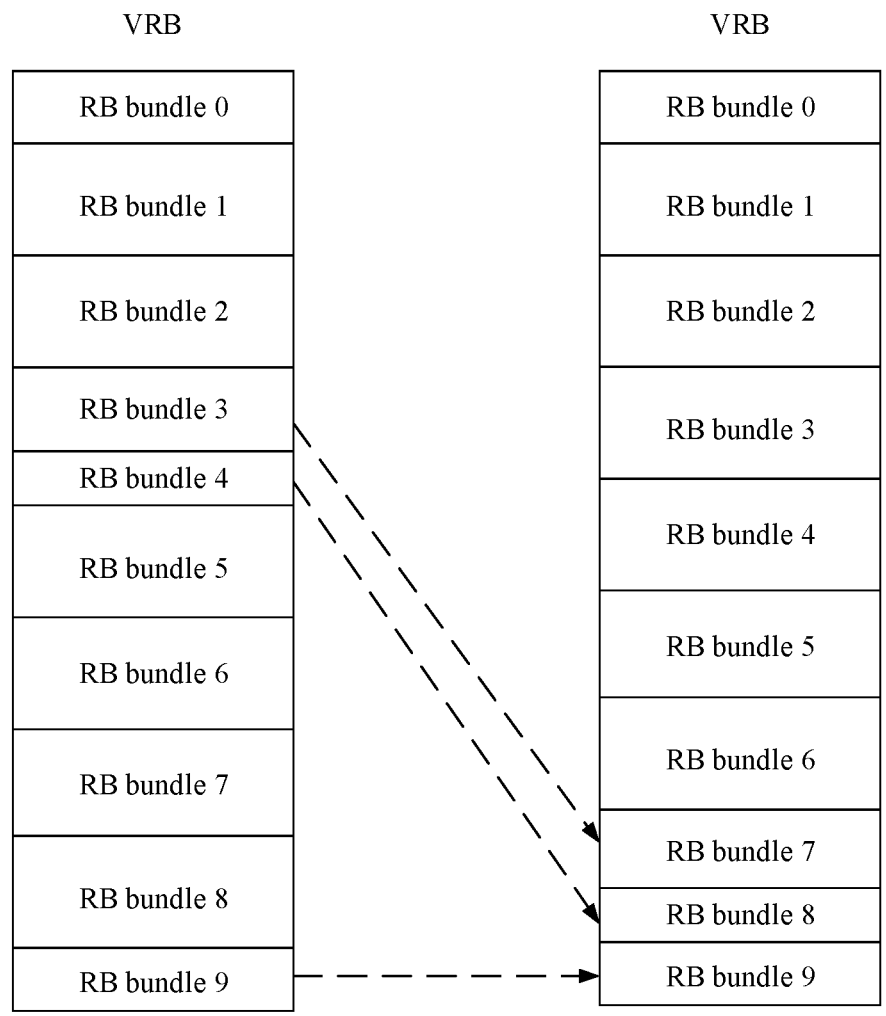
FIG. 12 is a schematic diagram of rearrangement of RBs in a VRB according to an embodiment.

In an interleave mapping process, first, a plurality of first RBs included in the three RB bundles (i.e., the RB bundle 3, the RB bundle 4, and the RB bundle 9) in the VRB shown on the left side of FIG. 12 are sequentially placed at the last location of the VRB. In other words, it may be understood that the RB bundle 3, the RB bundle 4, and the RB bundle 9 are sequentially placed at the end location of the VRB, and all RB bundles in the VRB are sorted and numbered again. After the renumbering, the RB bundles shown in the left part of FIG. 12 becomes the RB bundles shown in the right part of FIG. 12. It should be noted that, in the RB bundles renumbered in the VRB, the three RB bundles whose sizes are less than the preset RB bundle size, that is, the RB bundle 7, the RB bundle 8, and the RB bundle 9 still sequentially correspond to the RB bundle 3, the RB bundle 4, and the RB bundle 9 in the PRB.

For another RB bundle other than the RB bundle 7, the RB bundle 8, and the RB bundle 9 in the renumbered RB bundles in the VRB, that is, the seven RB bundles from the RB bundle 0 to the RB bundle 6, the interleave mapping method in the foregoing embodiment may be used to write the seven RB bundles into a matrix by rows as follows:

$$\begin{bmatrix} 0 & 1 \\ 2 & 3 \\ 4 & 5 \\ 6 & \text{null} \end{bmatrix}$$

Figure 13:
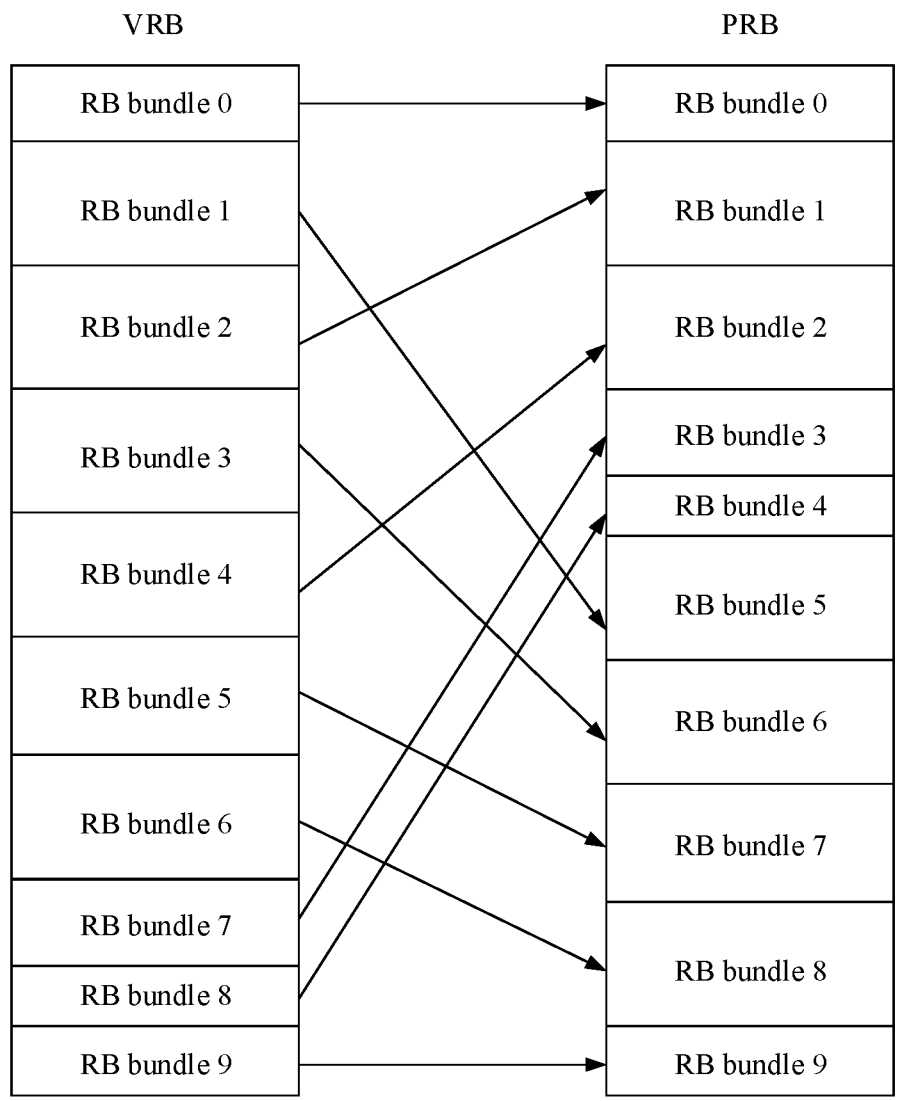
FIG. 13 is a schematic diagram of a joint interleave mapping result according to an embodiment.

In the 10 RB bundles of the PRB, a correspondence is established between each of the RB bundle 3, the RB bundle 4, and the RB bundle 9, and each of the RB bundle 7, the RB bundle 8, and the RB bundle 9 that are obtained after the renumbering in the VRB. Numbers of the remaining seven RB bundles in the PRB are sequentially (0, 1, 2, 5, 6, 7, 8). In this way, in a "reading by columns" manner, the RB bundles (0, 1, 2, 5, 6, 7, 8) in the PRB corresponding to the RB bundles (0, 2, 4, 1, 3, 5, 6) in the VRB may be obtained. FIG. 13 is a schematic diagram of a result of joint interleave mapping between a plurality of first RBs and a plurality of second RBs.

In sum, in an implementation process of joint interleave mapping between the plurality of first RBs and the plurality of second RBs, the joint interleave mapping may be used, so that the RBs allocated to the UE are more evenly dispersed in the PRB, and the UE obtains a greater frequency domain selective gain.

Optionally, in this embodiment, the mapping relationship between the N first RBs and the N second RBs may further include non-interleave mapping between the N first RBs and the N second RBs, or may be referred to as direct mapping between the N first RBs and the N second RBs. For example, N RBs are allocated to the UE, and an RB i in a VRB directly corresponds to an RB i in a PRB. In this case, it is assumed that N is 5, the following Table 4 shows an example of non-interleave mapping between five first RBs and five second RBs.

TABLE 4

| First RB | Second RB |
|---|---|
| RB 0 | RB 0 |
| RB 1 | RB 1 |
| RB 2 | RB 2 |
| RB 3 | RB 3 |
| RB 4 | RB 4 |

S103. The base station sends frequency domain resource indication information to the UE, where the frequency domain resource indication information is used to indicate a frequency domain resource that is in the at least one available frequency domain resource segment and that is used by the UE to transmit data.

In this embodiment, after the base station generates the frequency domain resource indication information corresponding to the frequency domain resource allocation manner, the base station may send the frequency domain resource indication information to the UE by using DCI, to indicate to the UE which frequency domain resource in the at least one available frequency domain resource segment is the frequency domain resource used by the UE to transmit data.

With reference to the related description in the foregoing embodiment, if the base station allocates the frequency domain resources to the UE in the frequency domain resource allocation manner 0, and the frequency domain resource indication information includes RBG indication information, the UE may determine according to the RBG indication information that at least of the $N_{RBG}$ RBGs in the at least one available frequency domain resource segment is the frequency domain resource that is allocated to the UE and that is used by the UE to transmit data. If the base station allocates the frequency domain resources to the UE in the frequency domain resource allocation manner 1, and the frequency domain resource indication information includes a RIV, the UE may determine, according to the RIV, the start first RB in the VRB corresponding to the at least one available frequency domain resource segment and the quantity N of first RBs, and then, the UE determines the N second RBs in the at least one available frequency domain resource segment according to the mapping relationship between the N first RBs and the N second RBs.

S104. The UE receives the frequency domain resource indication information sent by the base station. According to the frequency domain resource allocation method provided in this embodiment, the base station may send the frequency domain resource configuration information to the UE, and then, the base station may send the frequency domain resource indication information to the UE. The frequency domain resource indication information may indicate the frequency domain resource that is in the at least one available frequency domain resource in the frequency domain resources configured for the UE and that is used by the UE to transmit data. The frequency domain resource indication information is used to indicate the frequency domain resource that is in the at least one available frequency domain resource segment in the frequency domain resources configured for the UE and that is used by the UE to transmit data, and the frequency domain resource indication information no longer indicates a frequency domain resource in the at least one unavailable frequency domain resource segment. Therefore, a quantity of bits of the DCI used by the base station to send the frequency domain resource indication information to the UE can be reduced, thereby reducing signaling overheads required for allocating the frequency domain resources to the UE.

In an optional implementation, the base station may send, to the UE, configuration information including a mapping relationship between the RB in the VRB and the RB in the PRB. The mapping relationship may be the non-interleave mapping, the independent interleave mapping, or the joint interleave mapping described above. In this way, after the UE receives the RIV sent by the base station, the UE may map the plurality of first RBs to the plurality of second RBs according to the specified mapping relationship in the configuration information of the mapping relationship.

In another optional implementation, a mapping relationship between the RB in the VRB and the RB in the PRB may be preconfigured in the base station and the UE. The mapping relationship may be any one of the foregoing non-interleave mapping, the foregoing independent interleave mapping, and the foregoing joint interleave mapping. Likewise, the UE may map the plurality of first RBs to the plurality of second RBs according to the preconfigured mapping relationship.

In still another optional implementation, a plurality of mapping relationships between the RB in the VRB and the RB in the PRB may be preconfigured in the base station and the UE. For example, the non-interleave mapping, the independent interleave mapping, and the joint interleave mapping are all configured in the UE. The base station may send mapping relationship indication information to the UE. The mapping relationship indication information may indicate one of the plurality of mapping relationships. Therefore, the UE may map the plurality of first RBs to the plurality of second RBs according to the mapping relationship indicated in the mapping relationship indication information.

Figure 15:
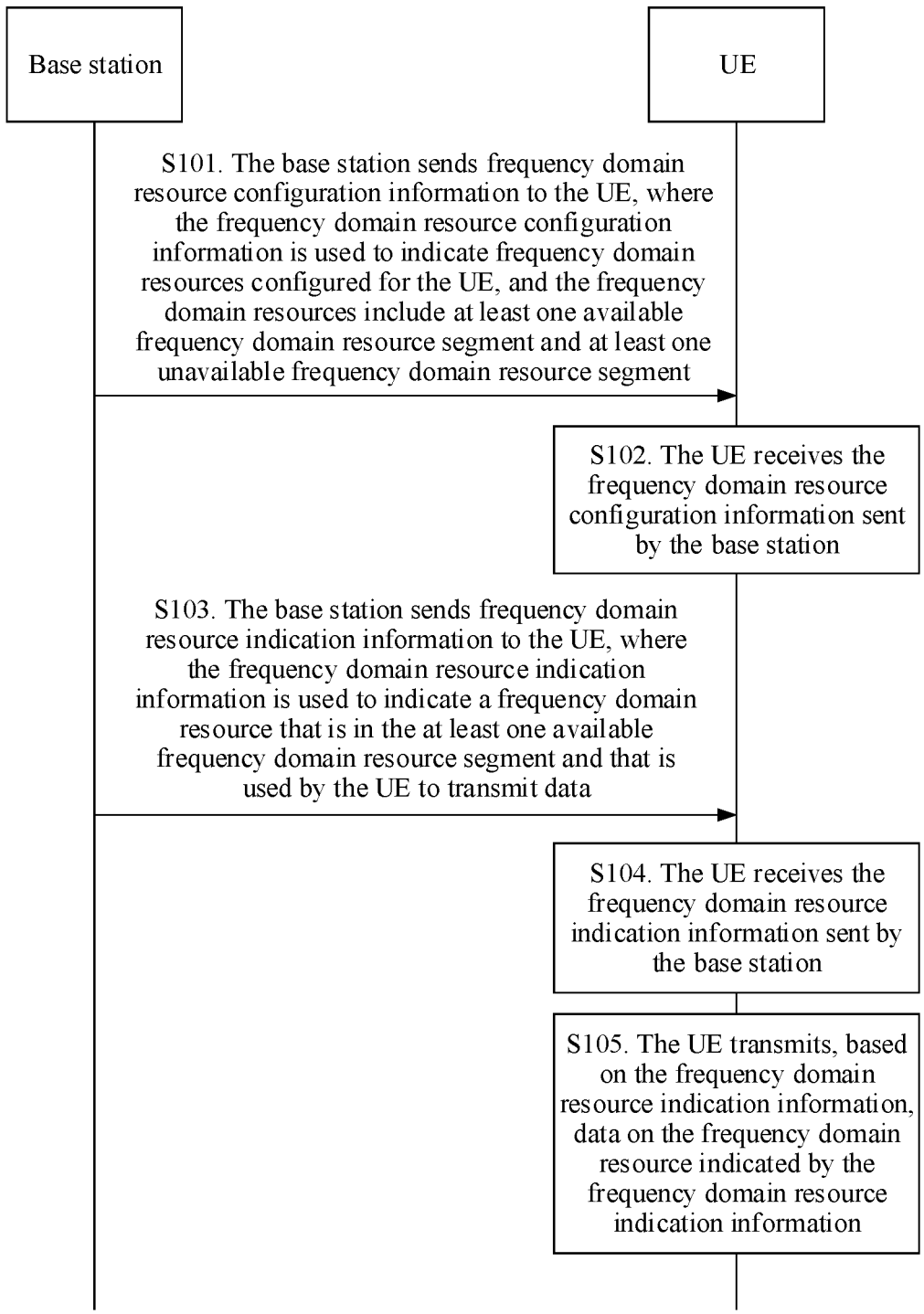
FIG. 15 is a schematic diagram of a frequency domain resource allocation method according to an embodiment.

With reference to FIG. 4, as shown in FIG. 15, the frequency domain resource allocation method provided in this embodiment may further include step S105.

S105. The UE transmits, according to the frequency domain resource indication information, data on the frequency domain resource indicated by the frequency domain resource indication information.

In this embodiment, after the UE receives the frequency domain resource indication information sent by the base station, the UE may determine, according to the RBG indication information in the frequency domain resource indication information, an RBG allocated by the base station to the UE, and then, the UE may transmit downlink data or uplink data by using the RBG; or the UE may determine the plurality of first RBs in the VRB according to the RIV in the frequency domain resource indication information, and then determine, according to the mapping relationship between the plurality of first RBs and the plurality of second RBs, the plurality of second RBs corresponding to the plurality of first RBs, so that the UE can receive downlink data or send uplink data by using the plurality of second RBs.

Figure 16:
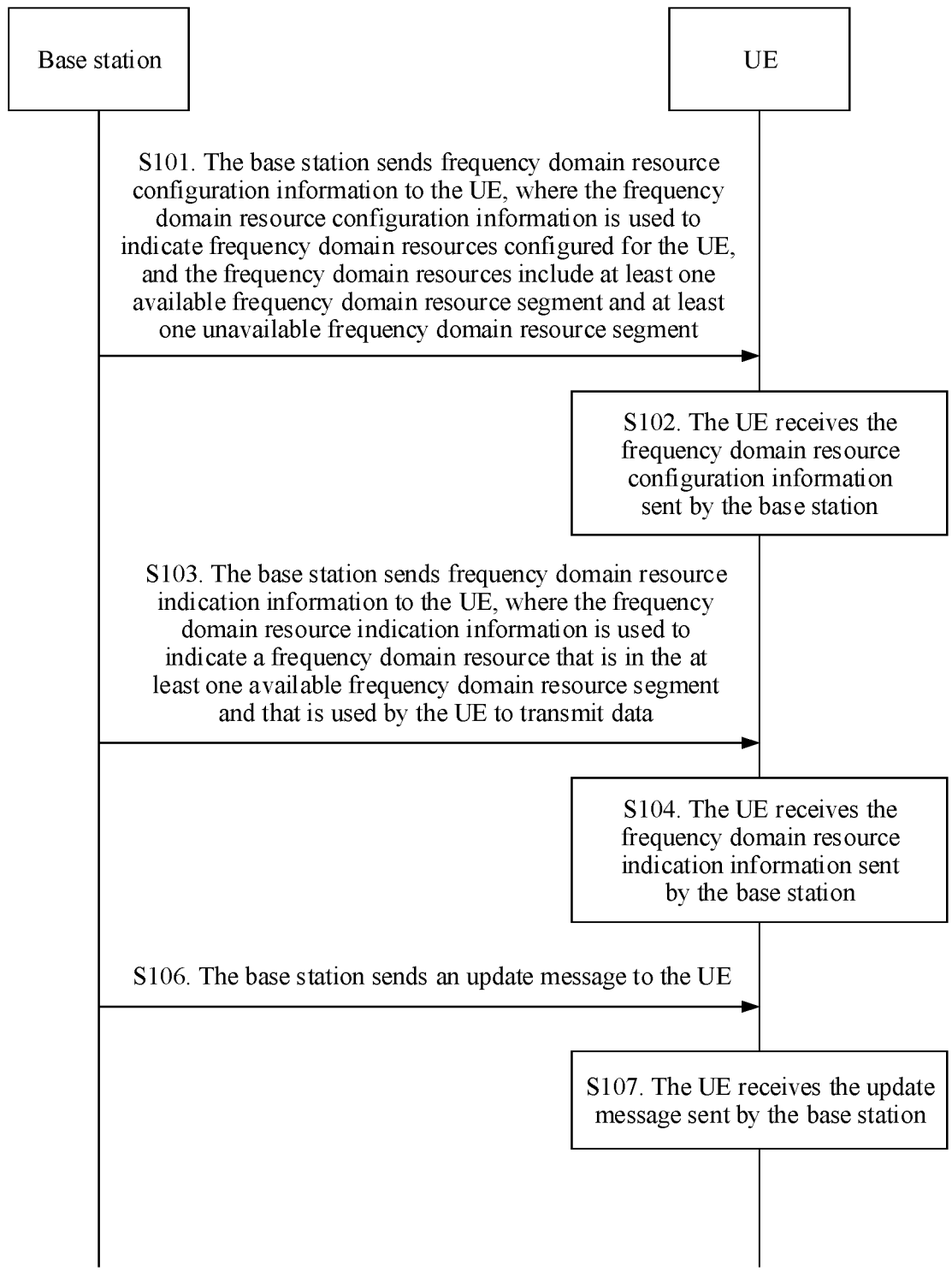
FIG. 16 is a schematic diagram of a frequency domain resource allocation method according to an embodiment.

Optionally, with reference to FIG. 4, as shown in FIG. 16, the frequency domain resource allocation method provided in this embodiment may further include step S106 and step S107.

S106. The base station sends an update message to the UE.

S107. The UE receives the update message sent by the base station.

The update message is used to indicate that all or a part of the at least one available frequency domain resource segment is changed to an unavailable frequency domain resource segment, or the update message is used to indicate that all or a part of the at least one unavailable frequency domain resource segment is changed to an available frequency domain resource segment.

Figure 14A:
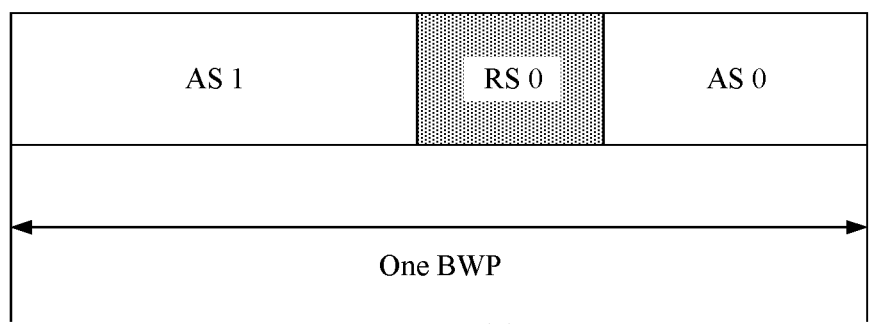
FIG. 14(a) and FIG. 14(b) are a schematic diagrams of frequency domain resources in one BWP according to an embodiment.
Figure 14B:
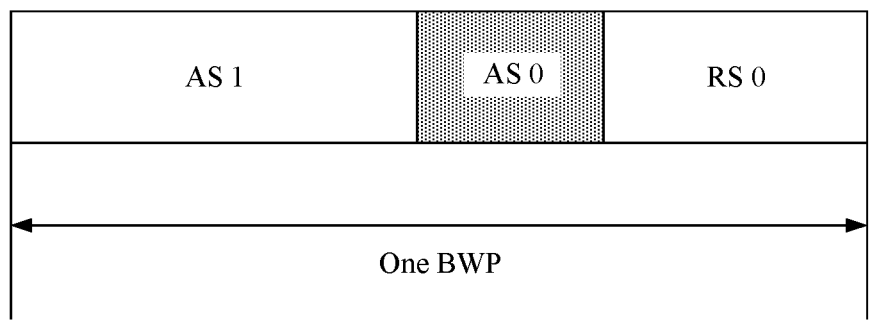

In this embodiment, the foregoing update message may include time information. The time information includes a first time point, or the time information includes a first time point and first duration. When the foregoing time information includes the first time point, the update message is used to indicate that an unavailable frequency domain resource segment (referred to as a frequency domain resource segment 1 in the following) in the frequency domain resource configured by the base station for the UE is changed to an available frequency domain resource segment from the first time point, or the update message is used to indicate that an available frequency domain resource segment (referred to as a frequency domain resource segment 1 in the following) in the frequency domain resources configured by the base station for the UE is changed to an unavailable frequency domain resource segment from the first time point. In this case, if the time indication information indicates that the frequency domain resource segment 1 is changed to an available frequency domain resource segment from the first time point, available frequency domain resources in the frequency domain resources configured by the base station for the UE are increased; if the time indication information indicates that the frequency domain resource segment 1 is changed to an unavailable frequency domain resource segment from the first time point, available frequency domain resources in the frequency domain resources configured by the base station for the UE are reduced. Optionally, as shown in FIG. 14, for example, the frequency domain resource configured for the UE is a BWP. In (a) of FIG. 14, available frequency domain resource segments in the BWP are an AS 0 and an AS 1, and an unavailable frequency domain resource segment exists between the AS 0 and the AS 1. The unavailable frequency domain resource segment is an RS 1. The base station may send, to the UE, an update message including a first time point, to indicate to the UE that the RS 0 in (a) of FIG. 14 is changed to an available frequency domain resource segment from the first time point. In (b) of FIG. 14, an available frequency domain resource segment in the BWP is an AS 0, and an unavailable frequency domain resource segment is an RS 0. The base station may send, to the UE, an update message including a first time point, to indicate to the UE that a frequency domain resource segment in (b) of FIG. 14 (for example, a frequency domain resource segment in the AS 0 indicated in (b) of FIG. 14, which is denoted as an AS 1) is changed to an unavailable frequency domain resource from the first time point.

When the foregoing time information includes the first time point and the first duration, the update message is used to indicate that an unavailable frequency domain resource segment (referred to as a frequency domain resource segment 1 in the following) in the frequency domain resources configured by the base station for the UE is changed to an available frequency domain resource segment in the first duration from the first time point, or the update message is used to indicate that an available frequency domain resource segment (referred to as a frequency domain resource segment 1 in the following) in the frequency domain resources configured by the base station for the UE is changed to an unavailable frequency domain resource segment in the first duration from the first time point.

In sum, in this embodiment, when the available frequency domain resources in the frequency domain resources configured by the base station for the UE are increased, overheads occupied for sending the frequency domain resource indication information by the base station by using the DCI are increased; when the available frequency domain resources in the frequency domain resources configured by the base station for the UE are reduced, overheads occupied for sending the frequency domain resource indication information by the base station by using the DCI are reduced.

Optionally, the base station may send the foregoing update message to the UE by using the DCI, or a media access control (MAC) control element (CE), or radio resource control (RRC) signaling. A sending manner may be selected according to an actual use requirement. This is not limited in this embodiment.

The foregoing mainly describes the solutions provided in the embodiments from a perspective of interaction between network elements. It may be understood that, to implement the foregoing functions, the network elements, for example, the base station and the UE, include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In some embodiments, the base station and the UE may be divided into functional modules according to the foregoing method examples. For example, each functional module may be obtained through division for each function, or two or more functions may be integrated into one processing module. The integrated module may be implemented in a form of hardware, or may be implemented in a form of a software functional module. It should be noted that, in this embodiment, module division is used as an example, and is merely a logical function division. In actual implementation, another division manner may be used.

Figure 17:
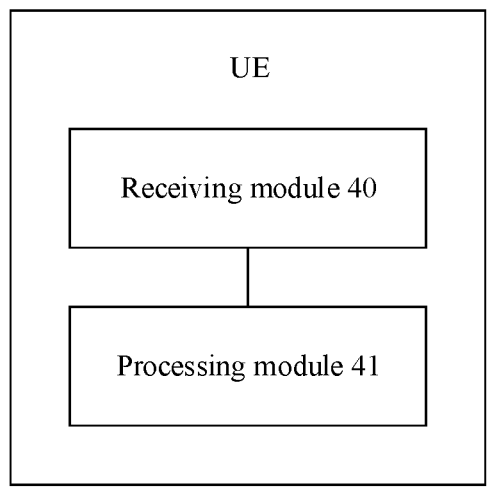
FIG. 17 is a schematic structural diagram of a frequency domain resource allocation apparatus according to an embodiment.

When function modules corresponding to functions are obtained through division, FIG. 17 is a possible schematic structural diagram of the UE in the foregoing embodiments. As shown in FIG. 17, the UE may include a receiving module 40. The receiving module 40 is configured to support the UE in performing S102, S104, and S107 in the foregoing method embodiments. The receiving module 40 includes three receiving modules: a first receiving module, a second receiving module, and a third receiving module, which are respectively configured to perform steps S102, S104, and S107. Optionally, the UE may further include a processing module 41. The processing module 41 is configured to support the UE in performing S105 in the foregoing method embodiment. All related content of the steps in the foregoing method embodiments may be cited in function descriptions of corresponding functional modules. Details are not described herein again.

Figure 18:
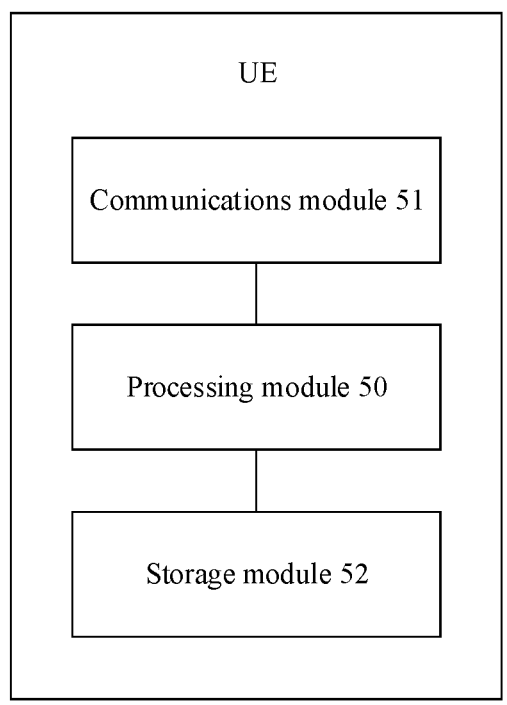
FIG. 18 is a schematic structural diagram of a frequency domain resource allocation apparatus according to an embodiment.

When an integrated unit is used, FIG. 18 is a possible schematic structural diagram of the UE in the foregoing embodiments. As shown in FIG. 18, the UE may include a processing module 50 and a communications module 51. The processing module 50 may be configured to control and manage an action of the UE. For example, the processing module 50 may be configured to support the UE in performing S105 in the foregoing method embodiment. The communications module 51 may be configured to support the UE in communicating with another network entity. For example, the communications module 51 may be configured to support the UE in performing S102, S104, and S107 in the foregoing method embodiment. Optionally, as shown in FIG. 18, the UE may further include a storage module 52, configured to store program code and data of the UE.

The processing module 50 may be a processor or a controller (which may be, for example, the central processing unit 21 shown in FIG. 2), and may be, for example, a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the embodiments. The processor may be a combination of processors implementing a computing function, for example, a combination of one or more microprocessors, or a combination of the DSP and a microprocessor. The communications module 51 may be a transceiver, a transceiver circuit, a communications interface, or the like (for example, may be the radio frequency unit 20 shown in FIG. 2). For example, the communications module 51 is a radio frequency transceiver circuit, and is configured to perform up-mixing on a to-be-sent signal during sending, and perform down-mixing on a received signal during receiving. The storage module 52 may be a memory.

When the processing module 50 is a processor, the communications module 51 is a transceiver, and the storage module 52 is a memory, the processor, the transceiver, and the memory may be connected via a bus. The bus may be a peripheral component interconnect (PCI) bus, an extended industry standard architecture (EISA) bus, and or the like. The bus may be classified into an address bus, a data bus, a control bus, and the like.

When signal receiving is performed, the processing module 50 and the communications module 51 jointly implement the signal receiving. The processing module 50 controls or invokes the communications module 51 to perform receiving. The processing module 50 is a decision maker and a controller of receiving behavior, and the communications module 51 is an executor of the receiving behavior.

Figure 19:
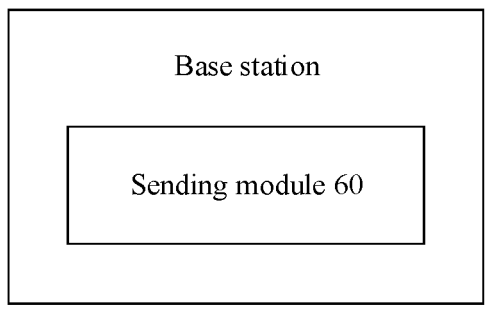
FIG. 19 is a schematic structural diagram of another frequency domain resource allocation apparatus according to an embodiment.

When function modules corresponding to functions are obtained through division, FIG. 19 is a possible schematic structural diagram of the base station in the foregoing embodiments. As shown in FIG. 19, the base station may include a sending module 60. The sending module 60 is configured to support the base station in performing S101, S103, and S106 in the foregoing method embodiment. For example, the sending module 60 includes three modules: a first sending module, a second sending module, and a third sending module, which are respectively configured to perform steps S101, S103, and S106. All related content of the steps in the foregoing method embodiments may be cited in function descriptions of corresponding functional modules. Details are not described herein again.

Figure 20:
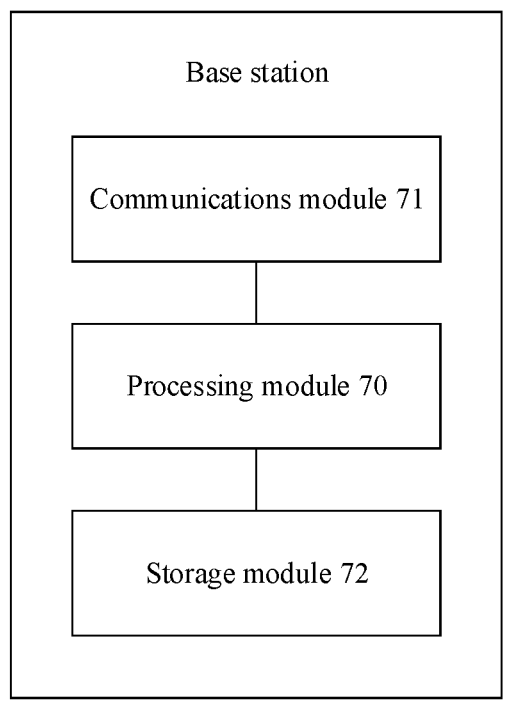
FIG. 20 is a schematic structural diagram of another frequency domain resource allocation apparatus according to an embodiment.

When an integrated unit is used, FIG. 20 is a possible schematic structural diagram of the base station in the foregoing embodiments. As shown in FIG. 20, the base station may include a processing module 70 and a communications module 71. The processing module 70 may be configured to control and manage an action of the base station. For example, the processing module 70 may be configured to support the base station in performing S201 (including S201*a* to S201*b*), S202, and S301 in the foregoing method embodiments. The communications module 71 may be configured to support the base station in communicating with another network entity. For example, the communications module 71 may be configured to support the base station in performing S101, S103, and S106 in the foregoing method embodiment. Optionally, as shown in FIG. 20, the base station may further include a storage module 72, configured to store program code and data of the UE. For example, the communications module 71 is a radio frequency transceiver circuit, and is configured to perform up-mixing on a to-be-sent signal during sending, and perform down-mixing on a received signal during receiving.

The processing module 70 may be a processor or a controller (for example, may be the processor 30 shown in FIG. 3), and may be, for example, a CPU, a general purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the embodiments. The processor may be a combination of processors implementing a computing function, for example, a combination of one or more microprocessors, or a combination of the DSP and a microprocessor. The communications module 71 may be a transceiver, a transceiver circuit, a communications interface, or the like (for example, may be the RF circuit 31 shown in FIG. 3). The storage module 72 may be a memory (for example, may be the memory 33 shown in FIG. 3).

When the processing module 70 is a processor, the communications module 71 is a transceiver, and the storage module 72 is a memory, the processor, the transceiver, and the memory may be connected via a bus. The bus may be a PCI bus, an EISA bus, or the like. The bus may be classified into an address bus, a data bus, a control bus, and the like.

When signal sending is performed, the processing module 70 and the communications module 71 jointly implement the signal sending. The processing module 70 controls or invokes the communications module 71 to perform sending. The processing module 70 is a decision maker and a controller of sending behavior, and the communications module 71 is an executor of the sending behavior.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, solid state drives (SSD)), or the like.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. According to such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely example implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
receiving frequency domain resource configuration information from a base station, wherein the frequency domain resource configuration information is used to indicate frequency domain resources configured for user equipment (UE), and the frequency domain resources comprise at least one available frequency domain resource segment and at least one unavailable frequency domain resource segment; and
receiving frequency domain resource indication information from the base station, wherein the frequency domain resource indication information is used to indicate a frequency domain resource that is in the at least one available frequency domain resource segment and that is used by the UE to transmit data, wherein
the frequency domain resource indication information comprises an indication that N first resource blocks (RBs) in a virtual resource block (VRB) correspond to the frequency domain resource used by the UE to transmit data,
a mapping relationship exists between the N first RBs in the VRB and N second RBs in a physical resource block (PRB) that are in the at least one available frequency domain resource segment, and
in the mapping relationship, a plurality of first RBs included in an RB bundle with a size less than a preset size of an RB bundle in the VRB is placed at a last location of the VRB in ascending order of frequencies.

2. The method according to claim 1, wherein
the at least one available frequency domain resource segment comprises at least one of at least two bandwidth parts (BWPs), or at least one available spectrum (AS) in at least one BWP of the at least two BWPs, and
the at least one unavailable frequency domain resource segment comprises at least one of at least one frequency domain resource segment other than the at least two BWPs, or at least one frequency domain resource segment other than the at least one AS in the at least one BWP of the at least two BWPs.

3. The method according to claim 1, wherein
the frequency domain resource indication information comprises resource block group (RBG) indication information,
the RBG indication information is used to indicate that at least one of $N_{RBG}$ RBGs is the frequency domain resource used by the UE to transmit data, and
$N_{RBG}$ is a total quantity of RBGs included in the at least one available frequency domain resource segment.

4. The method according to claim 3, wherein
a quantity of RBGs included in any available frequency domain resource segment i in the at least one available frequency domain resource segment is $N_{RBG, R_i} = \lceil M_{RB, R_i}/P \rceil$,
where $M_{RB, R_i}$ is a quantity of RBs included in the available frequency domain resource segment i, P is a quantity of RBs comprised in one RBG, $\lceil \ \rceil$ represents rounding up, and i is a natural number.

5. The method according to claim 3, wherein
a quantity of RBGs included in any available frequency domain resource segment i in the at least one available frequency domain resource segment is $$N_{RBG, R_i} = \lceil (M_{RB, R_i} - M_{RB, R_i, start})/P \rceil + 1,$$

where $M_{RB, R_i}$ is a quantity of RBs comprised in the available frequency domain resource segment i, $M_{RB, R_i, start}$ is a quantity of RBs comprised in a start RBG in the available frequency domain resource segment i, $M_{RB, R_i, start} = P - Q_{R_i, RB}$ modP, $Q_{R_i, RB}$ is an RB index corresponding to a start RB in the available frequency domain resource segment i, P is a quantity of RBs included in one RBG, $\lceil \ \rceil$ represents rounding up, mod represents a modulo operation, and i is a natural number.

6. The method according to claim 1, wherein
the frequency domain resource indication information comprises a resource indication value (RIV), the RIV is the indication used to indicate that N first RBs in the VRB are the frequency domain resources used by the UE to transmit data, the mapping relationship is a one-to-one mapping relationship between the N first RBs in the VRB and the N second RBs in the PRB.

7. The method according to claim 6, wherein the mapping relationship comprises interleave mapping between the N first RBs and the N second RBs.

8. The method according to claim 7, wherein
the at least one available frequency domain resource segment comprises at least two available frequency domain resource segments,
the interleave mapping is independent interleave mapping of each of the at least two available frequency domain resource segments, and
the independent interleave mapping is interleave mapping between a plurality of first RBs corresponding to each available frequency domain resource segment and a plurality of second RBs in each available frequency domain resource segment.

9. The method according to claim 7, wherein
the at least one available frequency domain resource segment comprises at least two available frequency domain resource segments,
the interleave mapping is joint interleave mapping of the at least two available frequency domain resource segments as a whole, and
the joint interleave mapping is interleave mapping between a plurality of first RBs corresponding to the at least two available frequency domain resource segments and a plurality of second RBs in the at least two available frequency domain resource segments.

10. The method according to claim 9, wherein
in the joint interleave mapping, except a start RB bundle of an available frequency domain resource segment with a lowest frequency in the at least two available frequency domain resource segments, the plurality of first RBs included in the RB bundle with the size less than the preset size of the RB bundle in the VRB is placed at the last location of the VRB in ascending order of frequencies, and each RB bundle comprises at least one RB.

11. The method according to claim 1, further comprising:
receiving an update message from the base station, wherein the update message is used to indicate that all or a part of the at least one available frequency domain resource segment is changed to an unavailable frequency domain resource segment, or the update message is used to indicate that all or a part of the at least one unavailable frequency domain resource segment is changed to an available frequency domain resource segment.

12. An apparatus, comprising:
one or more processors; and
a memory coupled to the one or more processors having computer readable instructions stored thereon that, when executed by the one or more processors, causes the apparatus to:
receive frequency domain resource configuration information from a base station, wherein the frequency domain resource configuration information is used to indicate frequency domain resources configured for user equipment (UE), and the frequency domain resources comprise at least one available frequency domain resource segment and at least one unavailable frequency domain resource segment; and
receive frequency domain resource indication information from the base station, wherein the frequency domain resource indication information is used to indicate a frequency domain resource that is in the at least one available frequency domain resource segment and that is used by the UE to transmit data, wherein
the frequency domain resource indication information comprises an indication that N first resource blocks (RBs) in a virtual resource block (VRB) correspond to the frequency domain resource used by the UE to transmit data,
a mapping relationship exists between the N first RBs in the VRB and N second RBs in a physical resource block (PRB) that are in the at least one available frequency domain resource segment, and
in the mapping relationship, a plurality of first RBs included in an RB bundle with a size less than a preset size of an RB bundle in the VRB is placed at a last location of the VRB in ascending order of frequencies.

13. The apparatus according to claim 12, wherein
the at least one available frequency domain resource segment comprises at least one of at least two bandwidth parts (BWPs), or at least one available spectrum (AS) in at least one BWP of the at least two BWPs; and
the at least one unavailable frequency domain resource segment comprises at least one of at least one frequency domain resource segment other than the at least two BWPs, or at least one frequency domain resource segment other than the at least one AS in the at least one BWP of the at least two BWPs.

14. The apparatus according to claim 12, wherein
the frequency domain resource indication information comprises resource block group (RBG) indication information,
the RBG indication information is used to indicate that at least one of $N_{RBG}$ RBGs is the frequency domain resource used by the UE to transmit data, and
$N_{RBG}$ is a total quantity of RBGs comprised in the at least one available frequency domain resource segment.

15. The apparatus according to claim 12, wherein
the frequency domain resource indication information comprises a resource indication value (RIV), the RIV is the indication used to indicate that N first RBs in the VRB are the frequency domain resources used by the UE to transmit data, the mapping relationship is a one-to-one mapping relationship between the N first RBs in the VRB and the N second RBs in the PRB.

16. The apparatus according to claim 12, wherein the apparatus is further caused to:
receive an update message from the base station, wherein the update message is used to indicate that all or a part of the at least one available frequency domain resource segment is changed to an unavailable frequency domain resource segment, or the update message is used to indicate that all or a part of the at least one unavailable frequency domain resource segment is changed to an available frequency domain resource segment.

17. A non-transitory computer readable medium having computer readable instructions stored there on that, when executed by at least one processor, cause an apparatus to:
receive frequency domain resource configuration information from a base station, wherein the frequency domain resource configuration information is used to indicate frequency domain resources configured for user equipment (UE), and the frequency domain resources comprise at least one available frequency domain resource segment and at least one unavailable frequency domain resource segment; and
receive frequency domain resource indication information from the base station, wherein the frequency domain resource indication information is used to indicate a frequency domain resource that is in the at least one available frequency domain resource segment and that is used by the UE to transmit data, wherein the frequency domain resource indication information comprises an indication that N first resource blocks (RBs) in a virtual resource block (VRB) correspond to the frequency domain resource used by the UE to transmit data, a mapping relationship exists between the N first RBs in the VRB and N second RBs in a physical resource block (PRB) that are in the at least one available frequency domain resource segment, and in the mapping relationship, a plurality of first RBs included in an RB bundle with a size less than a preset size of an RB bundle in the VRB is placed at a last location of the VRB in ascending order of frequencies.

18. The non-transitory computer readable medium according to claim 17, wherein the at least one available frequency domain resource segment comprises at least one of at least two bandwidth parts (BWPs), or at least one available spectrum (AS) in at least one BWP of the at least two BWPs; and the at least one unavailable frequency domain resource segment comprises at least one of at least one frequency domain resource segment other than the at least two BWPs, or at least one frequency domain resource segment other than the at least one AS in the at least one BWP of the at least two BWPs.

19. The non-transitory computer readable medium according to claim 17, wherein the frequency domain resource indication information comprises resource block group (RBG) indication information, the RBG indication information is used to indicate that at least one of $N_{RBG}$ RBGs is the frequency domain resource used by the UE to transmit data, and $N_{RBG}$ is a total quantity of RBGs comprised in the at least one available frequency domain resource segment.

20. The non-transitory computer readable medium according to claim 17, wherein the frequency domain resource indication information comprises a resource indication value (RIV), the RIV is the indication used to indicate that N first RBs in the VRB are the frequency domain resources used by the UE to transmit data, the mapping relationship is a one-to-one mapping relationship between the N first RBs in the VRB and the N second RBs in the PRB.

* * * * *

UNITED STATES PATENT AND TRADEMARK OFFICE
CERTIFICATE OF CORRECTION

PATENT NO. : 11,497,009 B2
APPLICATION NO. : 16/993045
DATED : June 14, 2022
INVENTOR(S) : Han Zhou It is certified that error appears in the above-identified patent and that said Letters Patent is hereby corrected as shown below:

In the Claims

Column 30, Lines 40-43 of Claim 4, which should be replaced with the paragraph below:

where $M_{RB, R_i}$ is a quantity of RBs included in the available frequency domain resource segment i, P is a quantity of RBs comprised in one RBG, ⌈ ⌉ represents rounding up, and i is a natural number.

Signed and Sealed this
Twentieth Day of December, 2022

Katherine Kelly Vidal
*Director of the United States Patent and Trademark Office*